(12) United States Patent
Lutz et al.

(10) Patent No.: US 11,584,082 B2
(45) Date of Patent: Feb. 21, 2023

(54) APPARATUSES AND RELATED SYSTEMS AND METHODS FOR TRANSPORTING CARRYING PLATES FOR AN ADDITIVE MANUFACTURING MACHINE OR SYSTEM

(71) Applicant: General Electric Company, Schenectady, NY (US)

(72) Inventors: Andreas Lutz, Freising (DE); Andreas Ullrich, Lichtenfels (DE); Glen Charles Fedyk, Fairfield Township, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 76 days.

(21) Appl. No.: 16/832,817

(22) Filed: Mar. 27, 2020

(65) Prior Publication Data
US 2021/0299961 A1    Sep. 30, 2021

(51) Int. Cl.
| | |
|---|---|
| *B29C 64/379* | (2017.01) |
| *B33Y 40/00* | (2020.01) |
| *B66F 9/18* | (2006.01) |
| *B66C 1/42* | (2006.01) |
| *B25J 15/00* | (2006.01) |
| *B62B 1/14* | (2006.01) |

(52) U.S. Cl.
CPC .......... *B29C 64/379* (2017.08); *B25J 15/00* (2013.01); *B33Y 40/00* (2014.12); *B62B 1/14* (2013.01); *B66C 1/42* (2013.01); *B66F 9/18* (2013.01); *B66F 9/185* (2013.01); *B66F 9/186* (2013.01)

(58) Field of Classification Search
CPC ......... B29C 64/379; B33Y 40/00; B66F 9/18; B62B 1/14
See application file for complete search history.

(56) References Cited

U.S. PATENT DOCUMENTS

| | | |
|---|---|---|
| 5,000,697 A | 3/1991 | Murphy |
| 5,961,107 A * | 10/1999 | Morghen ............... B25B 5/163 269/305 |
| 7,357,629 B2 | 4/2008 | Weiskopf et al. |
| 7,520,740 B2 | 4/2009 | Wahlstrom et al. |
| 7,621,733 B2 | 11/2009 | Reynolds et al. |
| 10,011,469 B2 | 7/2018 | Craft et al. |
| 10,029,307 B2 | 7/2018 | Shea et al. |

(Continued)

FOREIGN PATENT DOCUMENTS

KR     20190074080 A    6/2019

*Primary Examiner* — Nathan T Leong
(74) *Attorney, Agent, or Firm* — Dority & Manning, P.A.

(57) ABSTRACT

A system for transporting a carrying plate may include a lifting assembly comprising a carriage, and a carrying assembly. The lifting assembly may include a carriage having one or more lifting arms configured to lift the carrying assembly at least in part by one or more carrying arms of the carrying assembly. A carrying assembly may include a perimeter frame surrounding a perimeter of a carrying plate, one or more carrying arms attached to the perimeter frame, and one or more indexing pins extending or extensible inwardly from the perimeter frame. The one or more indexing pins may detachably secure the carrying plate to the perimeter frame. A method of transporting a carrying plate may include detachably securing a carrying plate to a perimeter frame of a carrying assembly and transporting the carrying assembly with a lifting assembly.

19 Claims, 15 Drawing Sheets

(56) References Cited

U.S. PATENT DOCUMENTS

2015/0258744 A1\* 9/2015 Muller .................. B33Y 10/00
264/37.29
2017/0326642 A1\* 11/2017 Shea ..................... B29C 64/245
2017/0326643 A1 11/2017 Barr \* cited by examiner

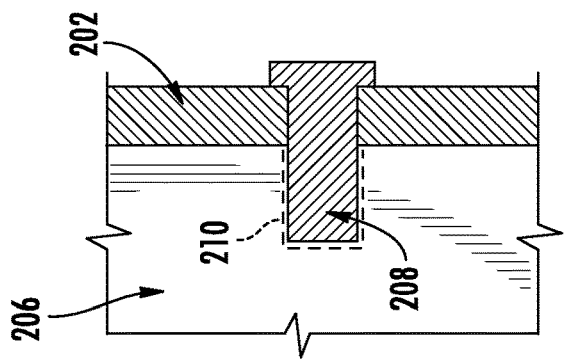
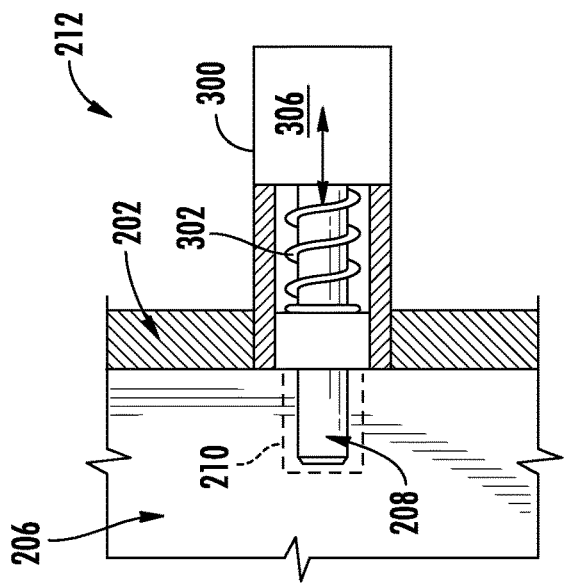
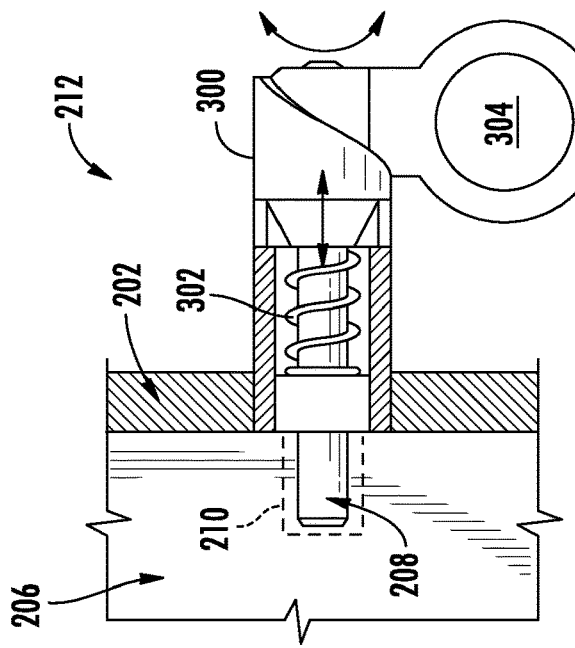

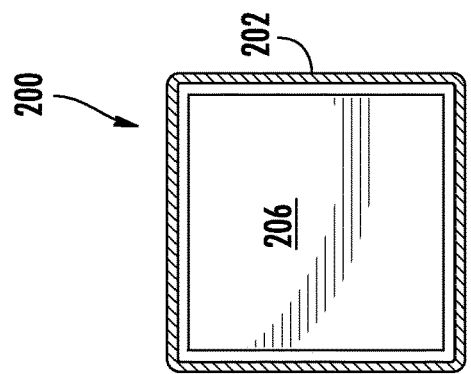
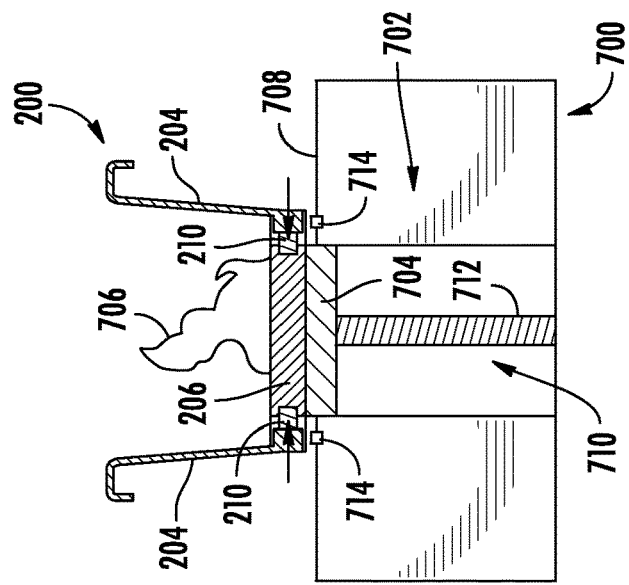
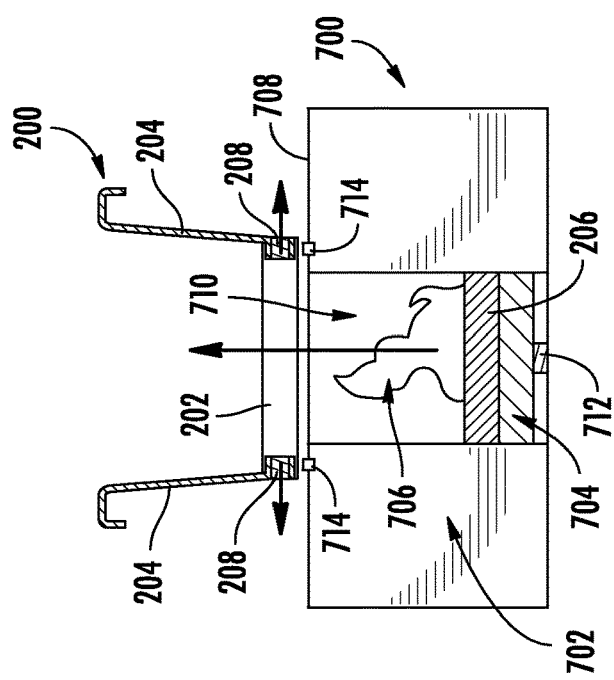

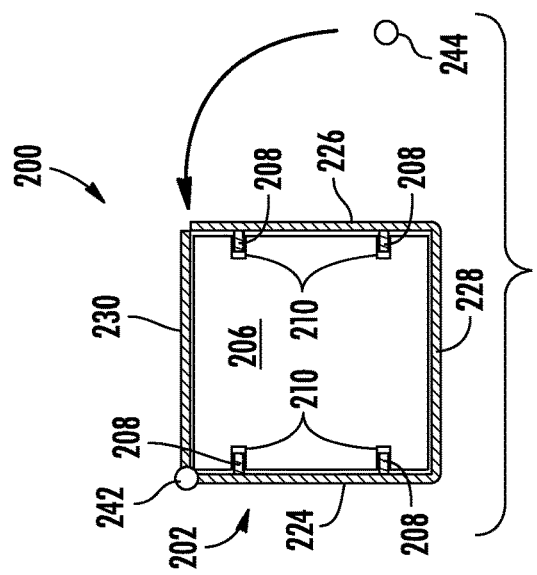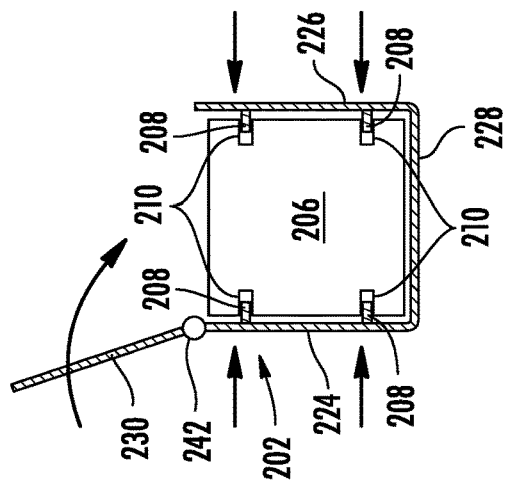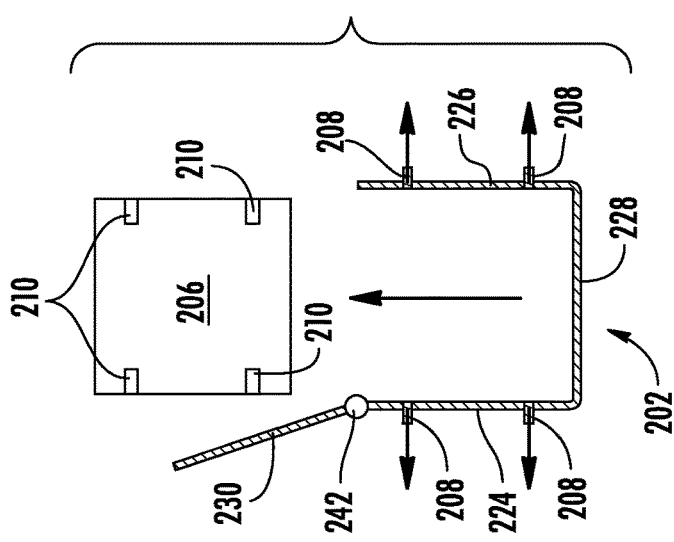

APPARATUSES AND RELATED SYSTEMS AND METHODS FOR TRANSPORTING CARRYING PLATES FOR AN ADDITIVE MANUFACTURING MACHINE OR SYSTEM

FIELD

The present disclosure generally pertains to apparatuses and related systems and methods for transporting carrying plates for an additive manufacturing system, such as carrying plates supporting additively manufactured components and powder materials, including additively manufactured components that are surrounded by unsolidified powder material and/or that are fixed or secured to the carrying plate upon which the components were additively manufactured.

BACKGROUND

Additive manufacturing systems that utilize a powder bed fusion (PBF) technology to additively manufacture components generally involve selectively solidifying sequential layers of a powder material by exposing selected regions of the sequential layers to an energy beam such as a laser or an electron beam that melts or sinters the powder material. The layers of powder material are supported by a build platform that is sequentially lowered into a build chamber in concert with the addition of sequential layers of powder material. At the completion of a build, the build platform has been lowered into the build chamber, with the build chamber housing a volume of unsolidified power material surrounding the additively manufactured component or components.

To remove the additively manufactured components from the build chamber, generally the build platform is raised towards the top of the build chamber, revealing the volume of unsolidified powder material. The additively manufactured components are unpacked from the unsolidified powder using an unpacking process that may involve the use of manual or automated unpacking tools such as vacuums, blowers, brushes and so forth. The unpacking process may take place at the same location where the components were additively manufactured and/or at an unpacking station located elsewhere in the additive manufacturing system. After unpacking, the additively manufactured components may be subjected to various finishing processes that may include thermal, mechanical, and/or chemical treatments to give the additively manufactured components desired strength, surface finish, and other properties or features.

At some point in the additive manufacturing process, the additively manufactured components may be removed from a workstation, such as a manufacturing or processing station, and/or transported from one workstation to another workstation, either before or after unpacking the components from the unsolidified powder. However, there are several challenges involved with moving or transporting additively manufactured components, whether alone or together with unsolidified powder material. The components may exceed weight or ergonomic limitations of workers, whether being transported individually or together with unsolidified powder material. Additionally, the powder material presents health and safety hazards attributable to the composition of the material and small size of the powder particles. Further, some components may have intricate features that call for careful handling, and some components and/or powder material may be sensitive to contaminants. Still further, some additive manufacturing systems or production processes may call for transporting at a time when the components and/or powder material are at a high temperature.

Accordingly, there exists a need for improved apparatuses and related systems and methods for transporting additively manufactured components and powder materials, such as additively manufactured components that are surrounded by unsolidified powder material and/or that are fixed or secured to a carrying plate upon which the components were additively manufactured.

BRIEF DESCRIPTION

Aspects and advantages will be set forth in part in the following description, or may be apparent from the description, or may be learned through practicing the presently disclosed subject matter.

In one aspect, the present disclosure embraces carrying assemblies for transporting a carrying plate for use in an additive manufacturing process. An exemplary carrying assembly may include a perimeter frame configured to surround a perimeter of a carrying plate, one or more carrying arms attached to the perimeter frame, and one or more indexing pins extending or extensible inwardly from the perimeter frame. The one or more indexing pins may be configured to detachably secure the carrying plate to the perimeter frame.

In another aspect, the present disclosure embraces systems for transporting a carrying plate for use in an additive manufacturing process. An exemplary system may include a lifting assembly comprising a carriage, and a carrying assembly. The carrying assembly may include a perimeter frame configured to surround a perimeter of a carrying plate, one or more carrying arms attached to the perimeter frame, and one or more indexing pins extending or extensible inwardly from the perimeter frame, with the one or more indexing pins configured to detachably secure the carrying plate to the perimeter frame.

In yet another aspect, the present disclosure embraces methods of transporting a carrying plate for use in an additive manufacturing process. An exemplary method may include detachably securing a carrying plate to a perimeter frame of a carrying assembly and transporting the carrying assembly with a lifting assembly. The carrying plate may be detachably secured to the perimeter frame of the carrying assembly with one or more indexing pins extending or extensible inwardly from the perimeter frame, and with the perimeter frame surrounding a perimeter of the carrying plate. The lifting assembly may include a carriage having one or more lifting arms configured to lift the carrying assembly at least in part by one or more carrying arms of the carrying assembly.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 3A-3C schematically depict exemplary indexing pins of a carrying assembly;

FIGS. 7A-7C schematically depict a carrying plate being detachably secured to an exemplary carrying assembly;

FIGS. 8A-8C schematically depict a carrying plate being detachably secured to another exemplary carrying assembly;

Figure 1A:
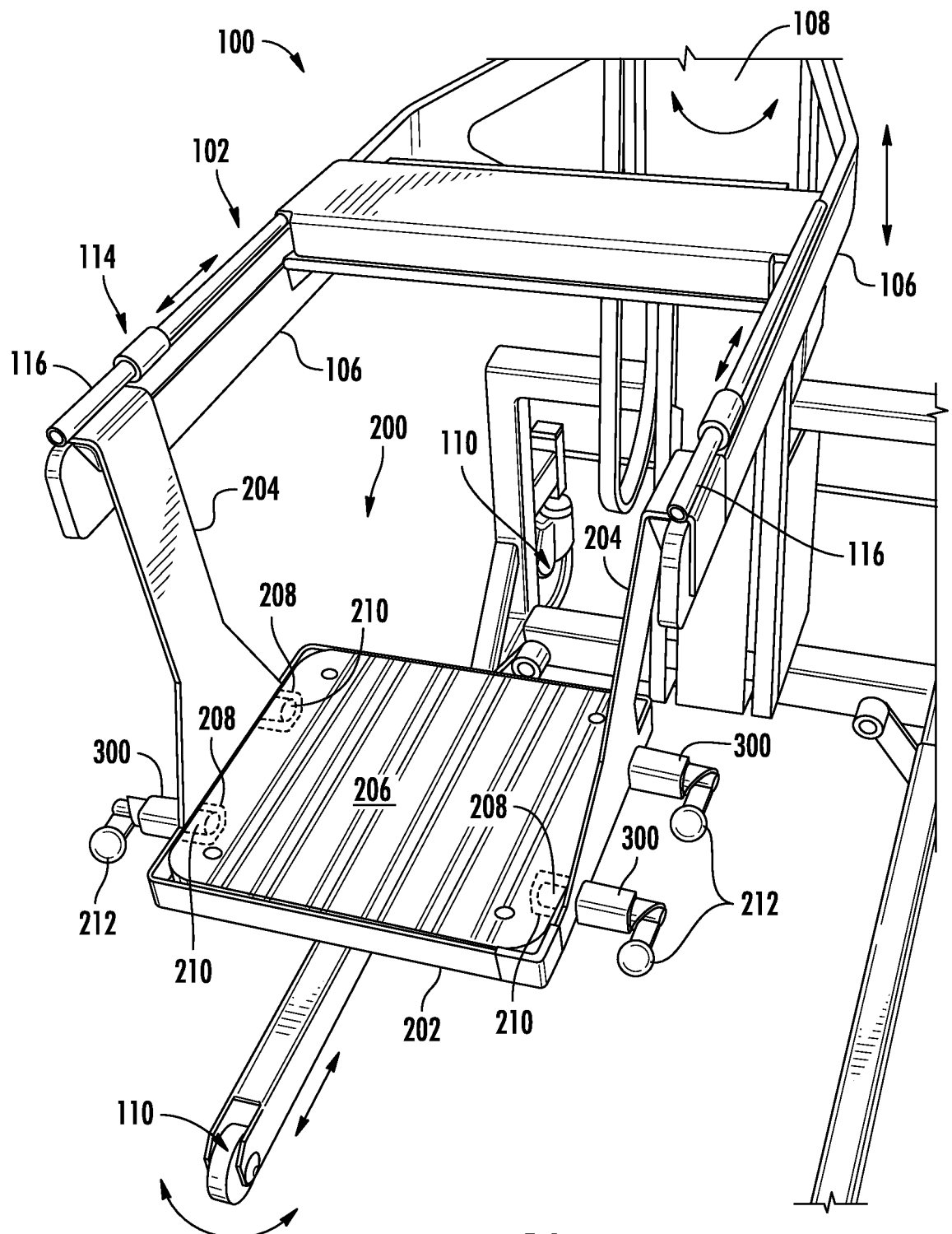
FIG. 1A schematically depicts an exemplary transport system for transporting a carrying plate, such as a carrying plate supporting additively manufactured components.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward". "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately." are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Exemplary embodiments of the present disclosure will now be described in further detail. FIG. 1 shows an exemplary transport system 100 for transporting additively manufactured components. The transport system may be configured to transport components alone or together with unsolidified powder material. The transport system 100 includes a lifting assembly 102 and a carrying assembly 200. The lifting assembly 102 may be utilized to transport the carrying assembly 200 with the carrying assembly 200 carrying a load of additively manufactured components, including before or after unpacking the components from unsolidified powder material. The transportation performed by the lifting assembly 102 may include lifting, rotating, pivoting, driving, conveying, rolling, shifting, translating, turning, repositioning, moving, and/or otherwise changing the position and/or location of the carrying assembly. The lifting assembly 102 may be mobile or stationary.

A mobile lifting assembly 102 may be configured as a transport cart, a forklift, a lifting trolley, a lifting cart, or the like that can be moved from one location to another, such as to transport a carrying assembly 200 between workstations. The lifting assembly 102 may be freely movable, such as across a floor of an additive manufacturing plant. Additionally, or in the alternative, a lifting assembly 102 may be movable along a track or conveyor system. The lifting assembly 102 may be freely movable along such a track or conveyor system, or movement of the lifting assembly 102 may be carried out by operational movement of the track or conveyor system.

A stationary lifting assembly 102 may be located in a fixed position. The fixed position may be permanent, semi-permanent, or temporary. For example, a stationary lifting assembly 102 may be mounted in a fixed position relative to an additive manufacturing system such as by bolting or otherwise fixing the lifting assembly 102 to the floor or to another workstation or piece of equipment within the additive manufacturing plant. From a fixed position, the stationary lifting assembly 102 may be configured to transport additively manufactured components between work stations, such as by lifting, rotating, pivoting, shifting, translating, turning, repositioning, moving, and/or otherwise changing the position and/or location of the carrying assembly from a fixed position.

Regardless of whether the lifting assembly 102 is movable or stationary, the lifting assembly 102 may be operated manually by an operator or autonomously by an automated control system. The lifting assembly 102 may be operable, manually and/or automatically, by operation of various operating elements, including mechanical, pneumatic, and/or electrical operating elements, configured to operate the lifting assembly, including performing operations such as lifting, transporting, and/or releasing a carrying assembly 200 and/or a load of additively manufactured components from the carrying assembly 200. The lifting assembly 102 may additionally or alternatively include various autonomous controls that may be configured, for example, to autonomously identify, lift, transport, and/or release a load of additively manufactured components.

As shown in FIG. 1A, an exemplary lifting assembly 102 may include a carriage 104 configured to transport a carrying assembly 200, which may carry a load of additively manufactured components. The carriage 104 may include one or more lifting arms 106 configured to lift the carrying assembly 200. By way of example, the lifting arms 106 may be configured as a pair of forks such as those utilized with a forklift, a lifting trolley, a lifting cart, or the like. The carriage 104 may include a support structure and/or one or more transport mechanism configured to support and transport the carrying assembly 200. By way of example, the one or more transport mechanisms may be configured to perform transport motions such as lifting, rotating, pivoting, driving, conveying, rolling, shifting, translating, turning, repositioning, moving, and/or otherwise changing the position and/or location of the carriage 104. In some embodiments, as shown in FIG. 1A, the support structure of the carriage 104 may include mast 108. In some embodiments, the mast 108 may include a first transport mechanism, such as lifting mechanism configured to lift the carrying assembly 200. The carriage 104 may include a second transport mechanism, such as wheels 110 configured to move the lifting assembly from one location to another.

An exemplary carrying assembly 200 may include a perimeter frame 202, and one or more carrying arms 204 attached to the perimeter frame 202. The one or more carrying arms 204 may extend upwardly from the perimeter frame 202. The length of the carrying arms 204 may be configured, for example, depending on specific additive manufacturing machine(s), and/or work station(s), and/or other characteristics of an additive manufacturing plant in which the carrying assembly may be intended to be utilized. The carrying arms 204 may be of sufficient length to allow the perimeter frame 202 to be lowered into an enclosure of an additive manufacturing machine and/or work station. For example, some additive manufacturing machines and/or work stations may have an access point situated above an elevation of a work surface from which a carrying plate 206 may be located for pickup or to which a carrying plate 206 may be transported. Additionally, or in the alternative, the carrying arms 204 may be of sufficient length to allow a load of additively manufactured components and/or unsolidified powder material situated on a carrying plate 206 to be transported with the carrying plate 206 situated at an elevation below that of the lifting arms 106, which may provide for improved stability during transport.

The perimeter frame 202 may be configured to at least partially surround a perimeter of a carrying plate 206. The carrying plate 206 may include any platform configured to carry additively manufactured components and/or unsolidified powder material. One or more indexing pins 208 extending or extensible inwardly from the perimeter frame 202 may be configured to removably secure the carrying plate 206 to the perimeter frame 202. For example, the one or more indexing pins 208 may respectively engage with corresponding bores 210 in a perimeter wall of the carrying plate 206. In some embodiments, the one or more indexing pins 208 may be respectively coupled to one or more actuators 212. The one or more actuators 212 may be operable manually or automatically by actuation of a mechanical, pneumatic, and/or electrical actuating element configured to extend and/or retract the indexing pin 208 so as to engage and/or disengage the indexing pin 208 from a corresponding bore 210 in a perimeter wall of the carrying plate 206.

In an exemplary embodiment, the carrying plate 206 may be a build plate upon which components may be or have been additively manufactured. In some embodiments, the carrying plate 206 may include one or more additively manufactured components fixed or secured to the carrying plate 206. For example, the additively manufactured components may be fused to the carrying plate 206 as a result of the additive manufacturing process melting or sintering the first few layers of powder material. Alternatively, the additively manufactured components may be attached to the carrying plate 206 by way of a tooling assembly configured to securely hold the components, such as for an additive repair process and/or for additively building upon a pre-existing component.

Figure 1B:
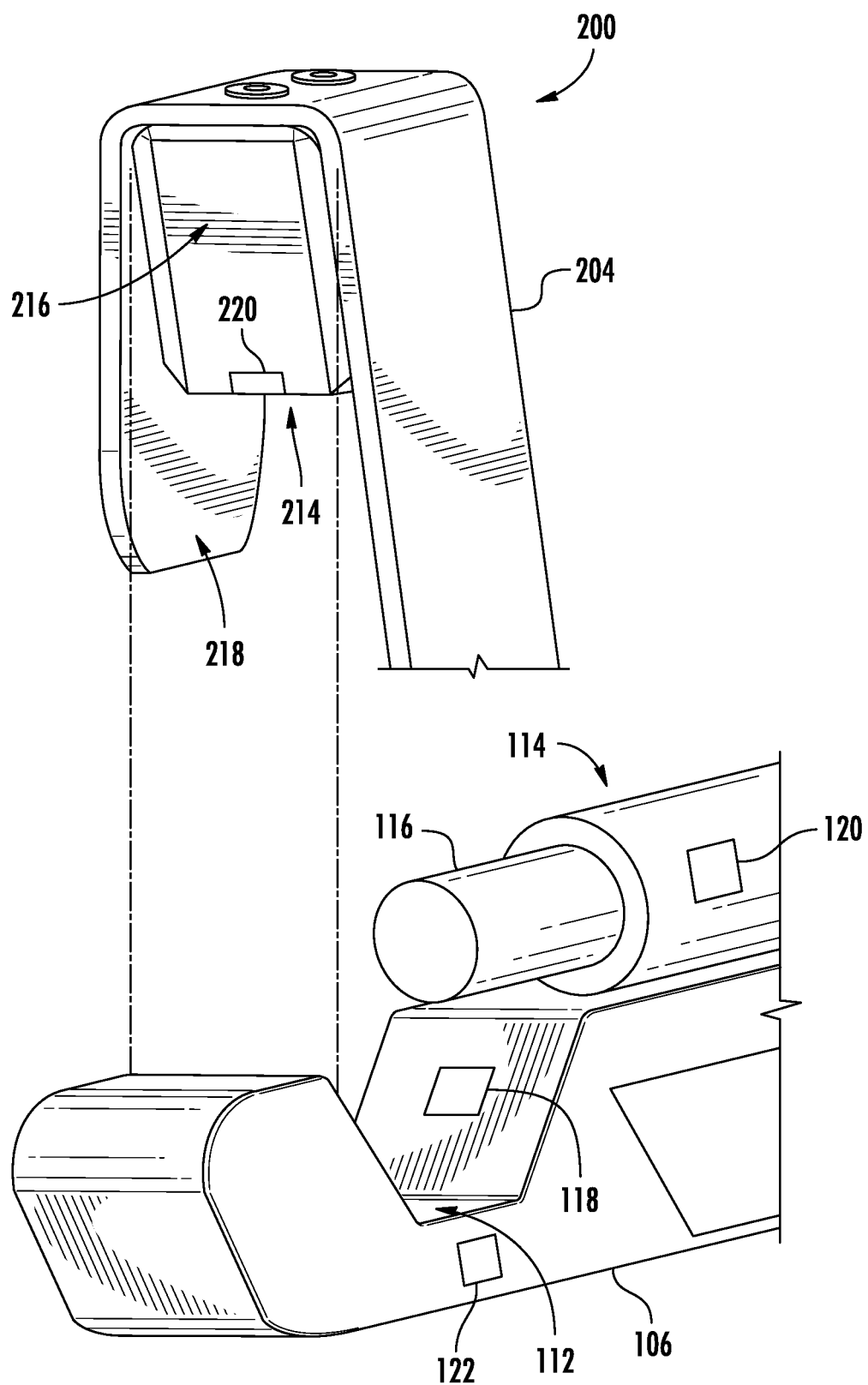
FIG. 1B schematically depicts an exemplary interface between a lifting assembly and a carrying assembly of a transport system.

As shown in FIG. 1B, the lifting arms 106 of the carriage 104 may include a carrying recess 112 located at a distal portion of the respective lifting arm 106. The carrying recess 112 may define a location of the lifting arm 106 suitable for lifting and transporting the carrying assembly 200. The carrying recesses 112 of the respective lifting arms 106 may be configured to interface with a corresponding carrying arm 204 of the carrying assembly 200, such as at a lifting point 214 that defines a portion of a carrying arm 204 from which the carrying assembly 200 may be suitably lifted by the lifting assembly 102. As shown, the carrying assembly 200 includes lifting points 214 located at a distal portion of the respective carrying arms 204. The carrying recess 112 and a corresponding lifting point 214 may interface with one another, for example, at least in part by respective profiles of the carrying recess 112 and lifting point 214 that mate with one another.

The lifting point 214 may include a lifting block 216 configured to interface with a carrying recess 112 on a corresponding lifting arm 106. Additionally, or in the alternative, the lifting point 214 may include an eye, a hook, a lug, a hanger, as well as combinations of these from which the carrying assembly may be lifted. As shown, the lifting block 216 and the carrying recess 112 have corresponding trapezoidal profiles; however, other corresponding profiles also may be provided. In some embodiments the profile of the lifting blocks 216 and/or carrying recesses 112 may correspond to a particular additive manufacturing machine, production line, and/or additive manufacturing plant. Such correspondence may provide a measure of security and/or quality control by preventing an incorrect or unauthorized transport. The carrying arms 204 may include a flange 218 configured to secure the respective carrying arm 204 to the corresponding lifting arm 106, such as at the carrying recess. For example, the flange may wrap at least partially around the carrying arm 204.

One or both of the lifting arms 106 may include a latch mechanism 114 configured to secure the respective carrying arm 204 within the corresponding carrying recesses 112. For example, a latch mechanism 114 may include a latch pin 116 that may be extended across the carrying arm 204, such as with the lifting block 216 situated in the carrying recess 112, to secure the carrying arm 204 to the lifting arm 106 for transport. The latch mechanisms 114 may be retractable to release the carrying arms 204 from the lifting arms 106 and/or to make the carrying recesses 112 available for picking up a carrying assembly 200. The latch mechanisms 114 may be operable, manually and/or automatically, by operation of one or more latching elements, which may be configured as mechanical, pneumatic, and/or electrical latching elements.

One or more of the lifting arms 106 may include a lifting-position sensor 118 configured to indicate when the corresponding carrying arm 204 has been secured to the lifting arm 106, such as with the lifting block 216 situated in the carrying recess 112. For example, the lifting-position sensor 118 may be disposed at or about the carrying recess 112 such that the lifting-position sensor 118 may be actuated when the lifting block 216 is situated in the carrying recess 112. Additionally, or in the alternative, one or more of the carrying arms 204 may include a carrying-position sensor 220 configured to indicate when the corresponding lifting arm 106 has received and secured the carrying arm 204, such as with the lifting block 216 situated in the carrying recess 112. For example, the carrying-position sensor 220 may be disposed at or about the lifting block 216 such that the carrying-position sensor 220 may be actuated when the lifting block 216 is situated in the carrying recess 112.

One or more of the latch mechanisms 114 may include a latch-position sensor 120 configured to indicate whether the latch mechanism 114 has been extended or retract, such as to confirm when the latch mechanism 114 has properly secured the respective carrying arm 204 to the corresponding lifting arm 106, such as within the respective lifting block 216 in the corresponding carrying recess 112. Operability of the latch mechanisms 114 may conditioned at least in part on the carrying arms 204 of the carrying assembly 200 being properly secured within the carrying recesses 112 of the lifting arms 106. For example, the latch mechanisms 114 may be extensible only upon the lifting blocks 216 being properly situated in the corresponding carrying recesses 112. The latch mechanism 114 may be physically prevented from extending unless the lifting blocks 216 is properly situated in the corresponding carrying recesses 112. For example, an improperly situated carrying arm 204 and/or lifting block 216 may physically impede extension of the latch pin 116. Additionally, or in the alternative, one or more of the lifting arms 106 may include a latch-release mechanism 122.

The latch-release mechanism 122 may be configured to be actuated when the carrying arm 204 has been properly situated on the lifting arm 106 and/or when the lifting block 216 has been properly situated in the carrying recess 112. When in an actuated state, the latch-release mechanism 122 may be operable to release the latch mechanisms 114 for operability. When in an unactuated state, the latch-release mechanism 122 may be operable to prevent operability of the latch mechanisms 114. In some embodiments, a lifting-position sensor 118 may operate as a latch-release mechanism 122, and/or a lifting-position sensor 118 and a latch-release mechanism 122 may define respective portions of an operating element.

In some embodiments, operability of the lifting assembly 102, such as lifting and/or transporting operations, may be conditioned upon the latch mechanisms 114 having properly secured the respective carrying arms 204 within the corresponding carrying recesses 112. For example, operability of the lifting assembly 102 may be conditioned upon a lifting-position sensor 118 and/or a carrying-position sensor 220 indicating that a carrying arm 204 has been secured to the lifting arm 106 and/or that a lifting block 216 has been situated in the carrying recess 112. Additionally, or in the alternative, operability of the lifting assembly 102 may be conditioned upon a latch-position sensor 120 indicating that a latch mechanism 114 has been extended so as to properly secure respective carrying arm 204 to the corresponding lifting arm 106, such as within the respective lifting block 216 in the corresponding carrying recess 112.

Figure 2A:
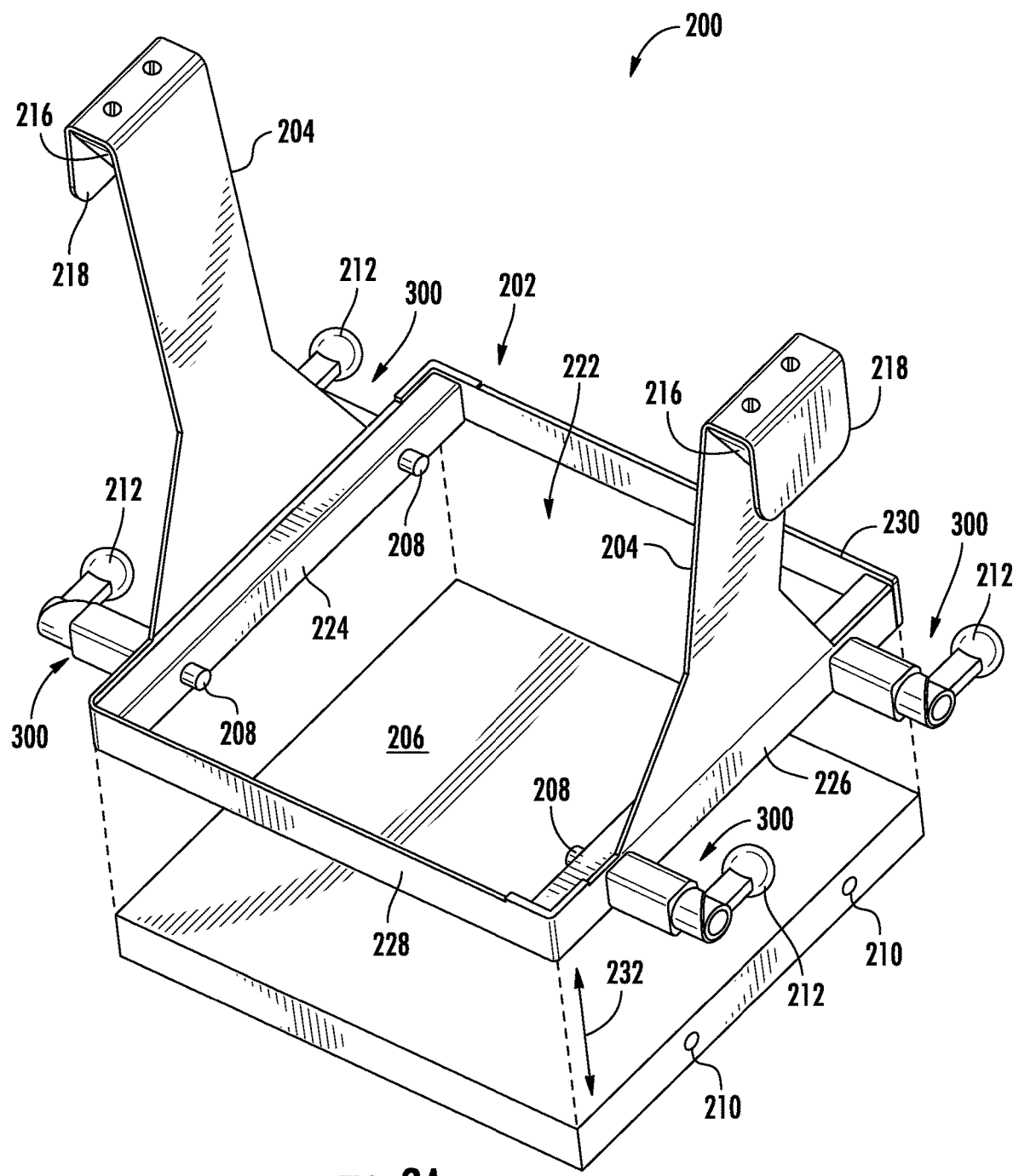
FIGS. 2A-2C schematically depict exemplary embodiments of a carrying assembly.
Figure 2B:
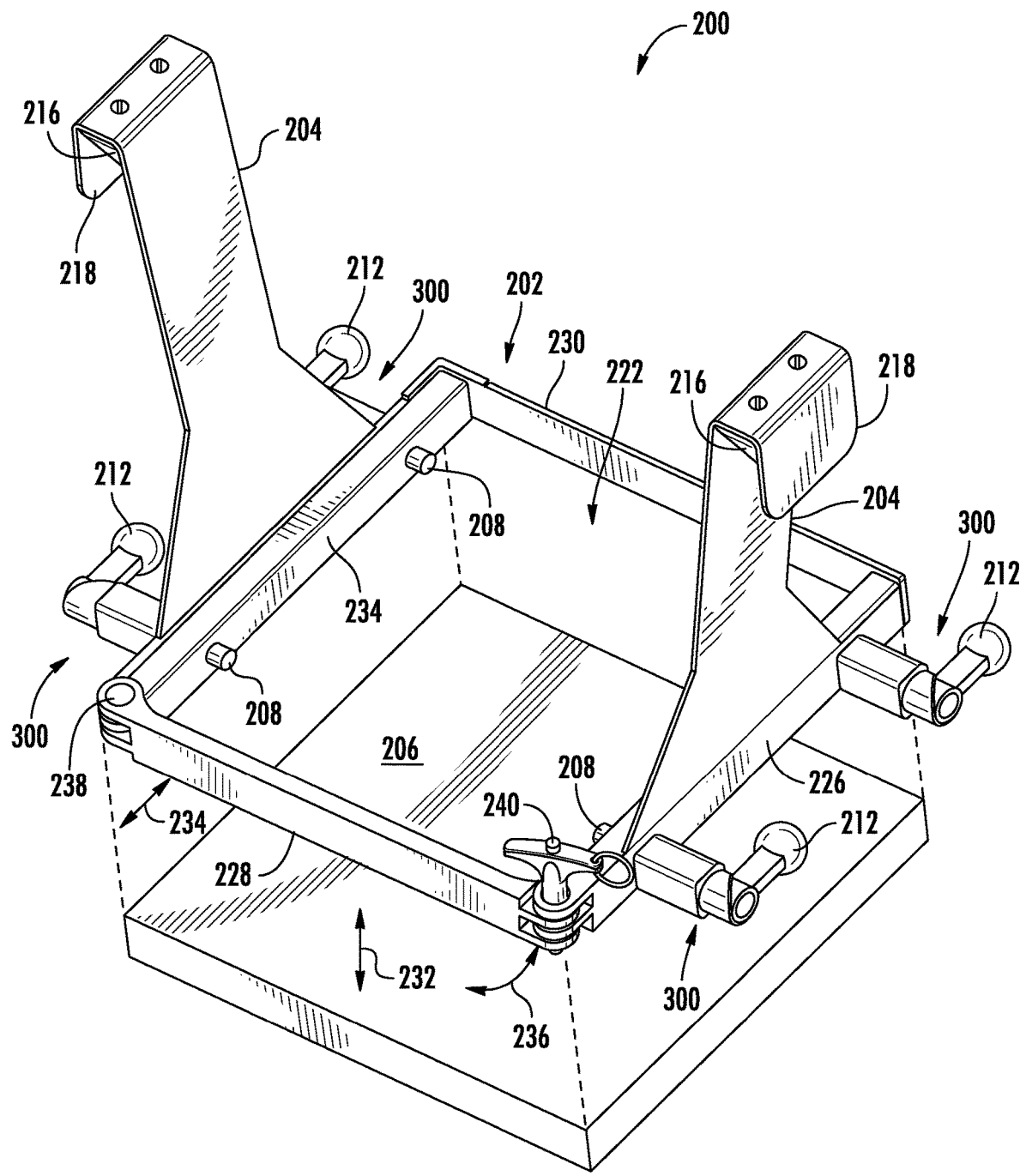
Figure 2C:
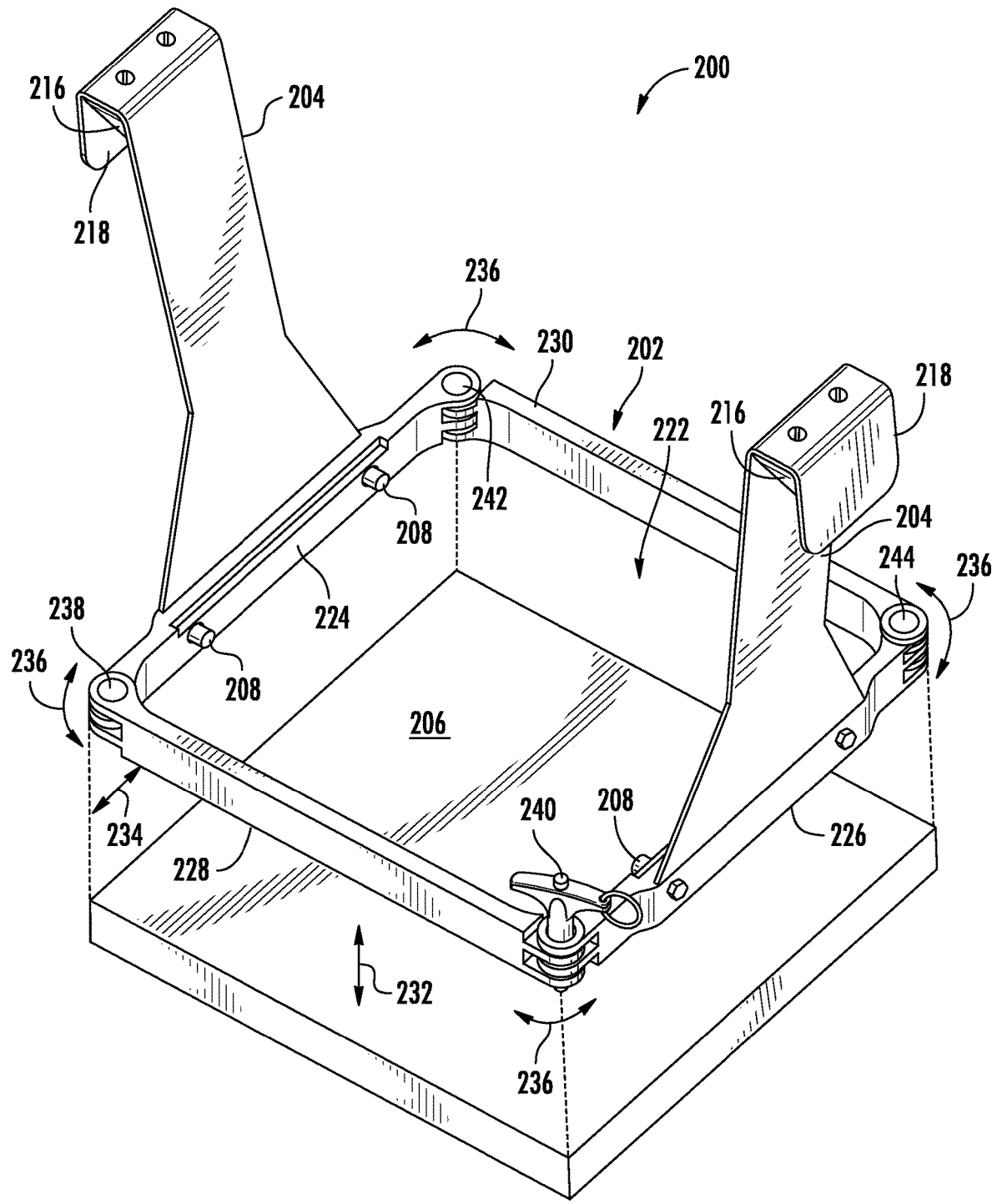

Now turning to FIGS. 2A-2C, exemplary embodiments of a carrying assembly 200 will be described. As shown, the carrying assembly 200 includes a perimeter frame 202 configured to at least partially surround a perimeter of a carrying plate 206. The perimeter frame 202 may include one or more segments that define a receiving area 222 that has an inner perimeter corresponding to an outer perimeter of a carrying plate 206. As shown in FIG. 2A, the perimeter frame 202 may be formed of a plurality of frame members that are integrally fixed (e.g., welded) or securely fastened (e.g., bolted) to one another. Additionally, or in the alternative, as shown in FIGS. 2B and 2C, the perimeter frame 202 may be formed of a plurality of frame members that are detachably and/or hingedly connected to one another, such as by a detent or quick-release pin, or the like. By way of example, the one or more segments of a perimeter frame 202 may include a left frame member 224, a right frame member 226, a front frame member 228, and/or a rear frame member 230. A respective segment may include an individual frame member or a combination of frame members.

FIG. 2A shows an exemplary carrying assembly 200 that has a perimeter frame 202 formed of a plurality of frame members that are integrally fixed or securely fastened to one another. As shown, the perimeter frame 202 may have a left frame member 224 with a frontward portion of the left frame member integrally fixed or securely fastened to a front frame member 228. The perimeter frame 202 may additionally or alternatively have a right frame member 226 with a frontward portion of the right frame member 226 integrally fixed or securely fastened to the front frame member 228. Also as shown, a rearward portion of the left frame member 224 may be integrally fixed or securely fastened to a rear frame member 230, and/or a rearward portion of the right frame member 226 may be integrally fixed or securely fastened to the rear frame member 230.

A perimeter frame 202 may be configured to receive and/or release a carrying plate 206, such as a build plate, from a bottom side of the perimeter frame 202. The carrying assembly 200 shown in FIG. 2A is one example of a carrying assembly 200 that has a perimeter frame 202 configured to receive a carrying plate 206 in the receiving area 222 from a bottom side of the perimeter frame 202. The carrying plate 206 may be received in the receiving area 222, for example, by raising the carrying plate 206 towards the carrying assembly 200 and/or by lowering the carrying assembly 200 from above the carrying plate 206 as indicated by vertically oriented arrows 232, such that the carrying plate 206 slides into the receiving area 222 from a bottom side of the perimeter frame 202 with the perimeter frame 202 surrounding the outer perimeter of the carrying plate 206. With the carrying plate 206 in position within the receiving area 222 of the perimeter frame 202, the indexing pins 208 of the carrying assembly 200 may be actuated to secure the carrying plate 206 to the perimeter frame 202. The carrying plate 206 may be released from the perimeter frame 202 by disengaging the indexing pins 208 and sliding the carrying plate 206 out of the receiving area 222 from the bottom side of the perimeter frame 202, as indicated by a vertically oriented arrow 232.

FIGS. 2B and 2C show exemplary carrying assemblies 200 with a perimeter frame 202 that has plurality of frame members that are detachably and/or hingedly connected to one another. The detachably and/or hingedly connected segments of the perimeter frame 202 in the carrying assemblies 200 shown in FIGS. 2B and 2C may be removed and/or hinged open to provide a pathway for receiving and/or releasing a carrying plate 206. In addition to the plurality of hingedly connected and/or detachably connected frame members, an exemplary carrying assembly 200 may have a perimeter frame 202 with a plurality of frame members that are integrally fixed or securely fastened to one another. For example, as shown in FIG. 2B, a rearward portion of the left frame member 224 may be integrally fixed or securely fastened to the rear frame member 230, and a rearward portion of the right frame member 226 may be integrally fixed or securely fastened to the rear frame member 230.

A perimeter frame 202 that has plurality of frame members that are detachably and/or hingedly connected to one another, such as shown in FIGS. 2B and 2C, may be coupled with a carrying plate 206 by sliding the carrying plate 206 laterally into the receiving area 222 defined by the inner perimeter of the perimeter frame 202 with at least one of the hingedly connected members in an extension position. Additionally, or in the alternative, a perimeter frame 202 that has plurality detachably and/or hingedly connected segments, such as shown in FIGS. 2B and 2C, may be coupled with a carrying plate 206 by wrapping one or more hinged portions of the perimeter frame 202 around the carrying plate 206, as indicated by arrows 236. Additionally, or in the alternative the carrying assemblies 200 shown in FIGS. 2B and 2C also may be configured to receive a carrying plate 206 in the receiving area 222 from a bottom side of the perimeter frame 202 by sliding the carrying plate 206 into the receiving area 222 and/or by sliding the perimeter frame 202 over the carrying plate 206 from a top side of the carrying plate 206. The perimeter frame 202 may receive the carrying plate 206 in the receiving area 222 by raising the carrying plate 206 towards the carrying assembly 200 and/or lowering the carrying assembly 200 towards the carrying plate 206, such that the carrying plate 206 slides into the receiving area 222.

A perimeter frame 202 such as shown, for example in FIG. 2B, may receive the carrying plate 206 in the receiving area 222 by detaching and/or hingedly opening at least one detachably and/or hingedly connected segment of the perimeter frame 202, and then sliding the perimeter frame 202 laterally relative to the carrying plate, as indicated by the laterally oriented arrow 234. With the carrying plate 206 in position within the receiving area 222 of the perimeter frame 202, the detached or open segments may be connected to the perimeter frame 202, and the indexing pins 208 of the carrying assembly 200 may be actuated to secure the carrying plate 206 to the perimeter frame 202. The carrying plate 206 may be released from the perimeter frame 202 by disengaging the indexing pins 208, detaching and/or hingedly opening at least one detachably and/or hingedly connected segment of the perimeter frame 202. The carrying plate 206 may be slid into the receiving area 222 from a bottom side of the perimeter frame 202, and/or the perimeter frame 202 may be slid laterally relative to the carrying plate 206. The indexing pins 208 may engage with the corresponding bores 210 in the perimeter wall of the carrying plate 206 with the carrying plate 206 properly situated in the receiving area 222.

As shown in FIGS. 2B and 2C, a perimeter frame 202 may include a plurality of hingedly connected frame members defined by at least one detachable connection point and at least one hinge point configured to allow at least one of the plurality of hingedly connected frame members to be moved between a state of flexion and a state of extension relative to a corresponding one of the plurality of hingedly connected frame members. The detachable connection point may include a first distal portion of a first one of the plurality of hingedly connected frame members, and a second distal portion of a second one of the plurality of hingedly connected frame members. The first distal portion may be detachably connectable with the second distal portion, such as by way of a detent or quick-release pin, or the like. The hinge point may include an opposite distal portion of the first one of the plurality of hingedly connected frame members, and a third distal portion of a third one of the plurality of hingedly connected frame members. The opposite distal portion may be hingedly connected with the third distal portion by way of a hinge. In some embodiments, a detent or quick-release pin, or the like may function as a hinged connection between the opposite distal portion and the third distal portion.

In some embodiments, a perimeter frame 202 such as shown in FIGS. 2B and 2C, may additionally or alternatively include a plurality of detachably connected frame members defined by a plurality of detachable connection points configured to allow at least one of the plurality of detachably connected frame members to be detached from a corresponding one of the plurality of detachably connected frame members. For example, as shown in FIGS. 2B and 2C, a leftward portion of the front frame member 228 may be detachably connected to a left frame member 224 of the perimeter frame 202 with a first detent 238, and a rightward portion of the front frame member 228 may be detachably connected to a right frame member 226 of the perimeter frame 202 with a second detent 240. Additionally, or in the alternative, as shown, for example in FIG. 2C, a leftward portion of a rear frame member 230 may be detachably connected to a left frame member 224 of the perimeter frame 202 with a third detent 242, and a rightward portion of the rear frame member 230 may be detachably connected to a right frame member 226 of the perimeter frame 202 with a fourth detent 244.

In some embodiments, the plurality of detachable connection points may also be hingedly connectable. For example, as shown in FIGS. 2B and 2C, the leftward portion of the front frame member 228 may be hingedly connected to the left frame member 224 with a first hinge (e.g., the first detent 238), and the rightward portion of the front frame member 228 may be hingedly connected to the right frame member 226 with a second hinge (e.g., the second detent 240). In some embodiments, the front frame member 228 of the perimeter frame 202 may have a leftward portion detachably connected to a left frame member 224 with a first detent 238, and a rightward portion and the rightward portion hingedly connected to a right frame member 226 with a second hinge (e.g., the second detent 240). Additionally, or in the alternative, as shown, the rightward portion of the front frame member 228 may be detachably connected to the right frame member 226 with the second detent 240, and the leftward portion of the front frame member 228 may be hingedly connected to the left frame member 224 with a first hinge (e.g., the first detent 238). The hinged connection between the front frame member 228 and the left frame member 224 may define a first corner of the perimeter frame 202. The hinged connection between the front frame member 228 and the right frame member 226 may define a second corner of the perimeter frame 202.

As further shown in FIG. 2C, in some embodiments, the leftward portion of the rear frame member 230 may be hingedly connected to the left frame member 224 with a third hinge (e.g., the third detent 242), and the rightward portion of the rear frame member 230 may be hingedly connected to the right frame member 226 with a fourth hinge (e.g., the fourth detent 244). In some embodiments, the rear frame member 230 of the perimeter frame 202 may have a leftward portion detachably connected to a left frame member 224 with a third detent 242, and a rightward portion and the rightward portion hingedly connected to a right frame member 226 with the fourth hinge (e.g., the fourth detent 244). Additionally, or in the alternative, as shown, the rightward portion of the rear frame member 230 may be detachably connected to the right frame member 226 with the fourth detent 244, and the leftward portion of the rear frame member 230 may be hingedly connected to the left frame member 224 with the third hinge (e.g., the third detent 242). The hinged connection between the rear frame member 230 and the left frame member 224 may define a third corner of the perimeter frame 202. The hinged connection between the rear frame member 230 and the right frame member 226 may define a fourth corner of the perimeter frame 202.

A perimeter frame 202 such as shown, for example in FIG. 2C, may receive the carrying plate 206 in the receiving area 222 by positioning the perimeter frame 202 around the perimeter of the carrying plate 206 with at least one of the detachably connectable frame members in a detached position relative to a corresponding one of the plurality of hingedly connected frame members, and at least one of the plurality of hingedly connected frame members positioned in a state of extension relative to a corresponding one of the plurality of hingedly connected frame members. The at least one of the plurality of hingedly connected frame members may then be moved to a state of flexion relative to the corresponding one of the plurality of hingedly connected frame members, and the at least one of the detachably connectable frame members may then be detachably connected to the corresponding one of the plurality of hingedly connected frame.

In some embodiments, a carrying assembly 200 such as those shown in FIGS. 2A-2C may have a perimeter frame 202 with fixed geometry corresponding to the geometry of a carrying plate 206 with which the carrying assembly 200 is intended to be used. Alternatively, the perimeter frame 202 may have an adjustable geometry so as to be utilized with a variety of carrying plates 206 with different geometries. For example, the left frame member 224 and the right frame member 226 have an adjustable length; and/or wherein the rear frame member 230 and the front frame member 228 have an adjustable length. The adjustable length may be provided by way of telescopic frame members that may be slidably secured at a plurality of lengths.

Now turning to FIGS. 3A-3C, exemplary actuators 212 and indexing pins 208 will be described. As shown in FIGS. 3A and 3B, in some embodiments, a carrying assembly 200 may include one or more indexing plungers 300. As shown, an actuator 212 and an indexing pin 208 may define respective portions of an indexing plunger 300. Additionally, or in the alternative, an actuator 212 and an indexing pin 208 may be provided that are not configured as an indexing plunger 300. In some embodiments, a carrying assembly 200 may include one or more indexing pins 208 respectively coupled to one or more actuators 212. Additionally, or in the alternative, one or more actuators 212 may be provided remotely relative to the respective indexing pin 208 and/or indexing plunger 300.

An indexing plunger 300 may be fixed to the perimeter frame 202 of a carrying assembly 200. An indexing pin 208 may extend inwardly from an inner perimeter of the perimeter frame 202, such as when actuated by an actuator 212. For example, an indexing plunger 300 may respectively include an actuator 212 disposed about an exterior of the perimeter frame 202 and a indexing pin 208 that is extensible inwardly from the perimeter frame 202 upon actuating the actuator 212. The indexing plunger 300 may include an extension and/or retraction mechanism 302, which may include a spring, a hydraulic cylinder, or the like, configured to extend and/or retract the indexing pin 208. For example, an actuator 212 may be configured as a spring-loaded indexing plunger 300.

An indexing plunger 300 may be operable manually and/or by automatic control. An indexing pin 208 may be extended into and/or retracted from a corresponding bore 210 in a perimeter wall of the carrying plate 206, such as when actuated by the actuator 212. For example, as shown in FIG. 3A, an indexing plunger 300 and/or an actuator 212 that can be actuated manually may include a lever 304 configured to cause the indexing pin 208 to extend and retract. As shown in FIG. 3B, an indexing plunger 300 and/or an actuator 212 that can be actuated automatically may an electronic or pneumatic device 306 configured to cause the indexing pin 208 to extend and retract.

In some embodiments, a carrying assembly 200 may include one or more indexing pins 208 that are configured to snap into position in the respective bores 210 of a carrying plate 206 when inserting the carrying plate 206 into the receiving area 222 (see, e.g., FIG. 1A). For example, an indexing plunger 300 may include an extension and/or retraction mechanism 302 coupled to an indexing pin 208, such as with or without an actuator 212. The extension and/or retraction mechanism 302 may be configured to allow the indexing pins 208 to depress as the carrying plate 206 slides into the receiving area 222, and then snap into position within the corresponding bores 210 as the bores 210 align with the indexing pins 208.

As shown in FIG. 3C, one or more indexing pins 208 may be fixed in a stationary position relative to the perimeter frame 202. The one or more indexing pins 208 may be stationary rather than being extensible and/or retractable. An indexing pin 208 that is fixed in a stationary position may be inserted into a corresponding bore 210 in a perimeter wall of the carrying plate 206, such as when hingedly connecting and/or wrapping one or more hinged portions of the perimeter frame 202 around the carrying plate 206. For example, one or more indexing pins 208 may be configured to engage with a corresponding bore 210 in a perimeter wall of a carrying plate 206 when moving a plurality of hingedly connected frame members to a state of flexion relative to one another.

Figure 4A:
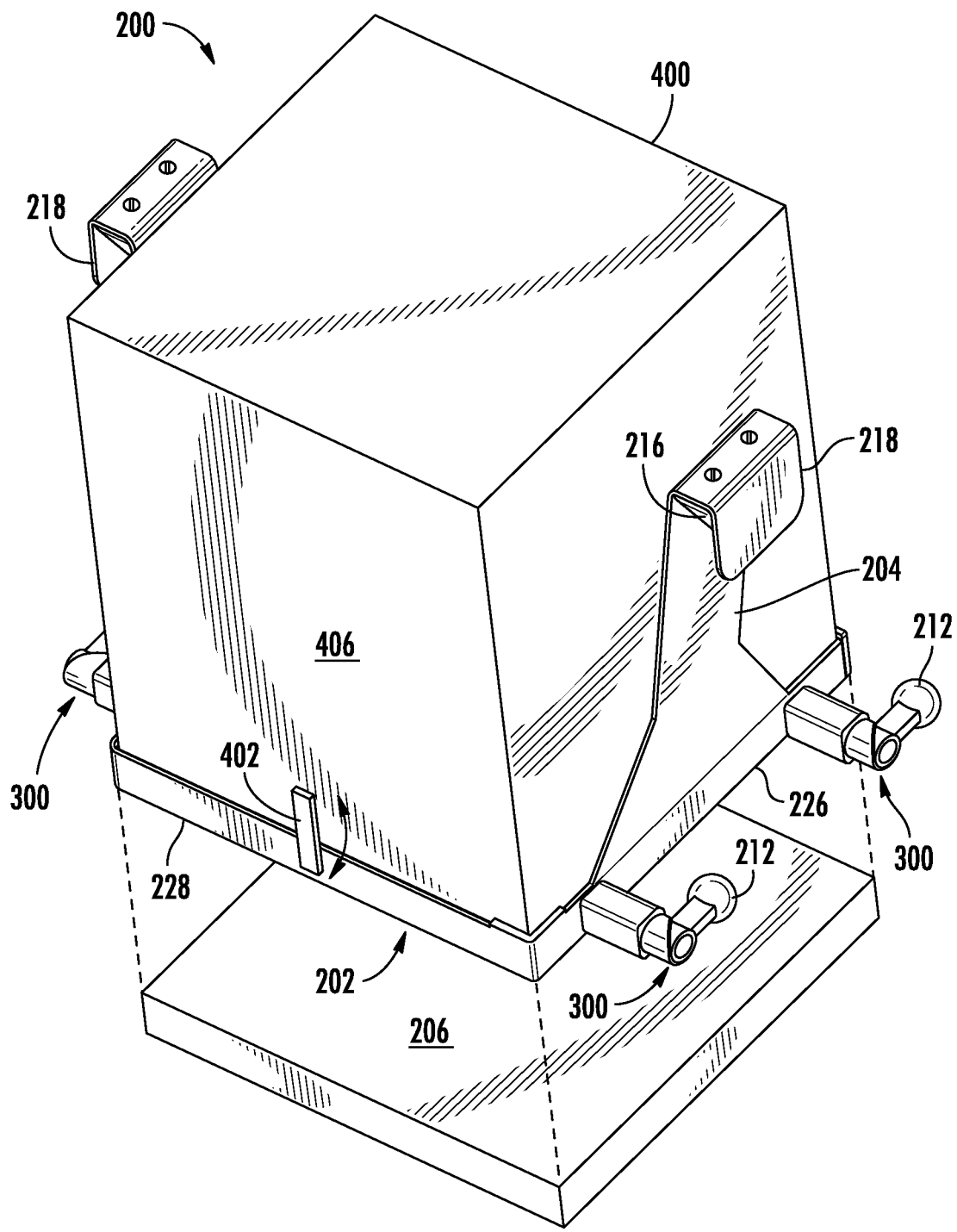
FIGS. 4A-4C schematically depict exemplary embodiments of a carrying assembly that include a containment module.
Figure 4C:
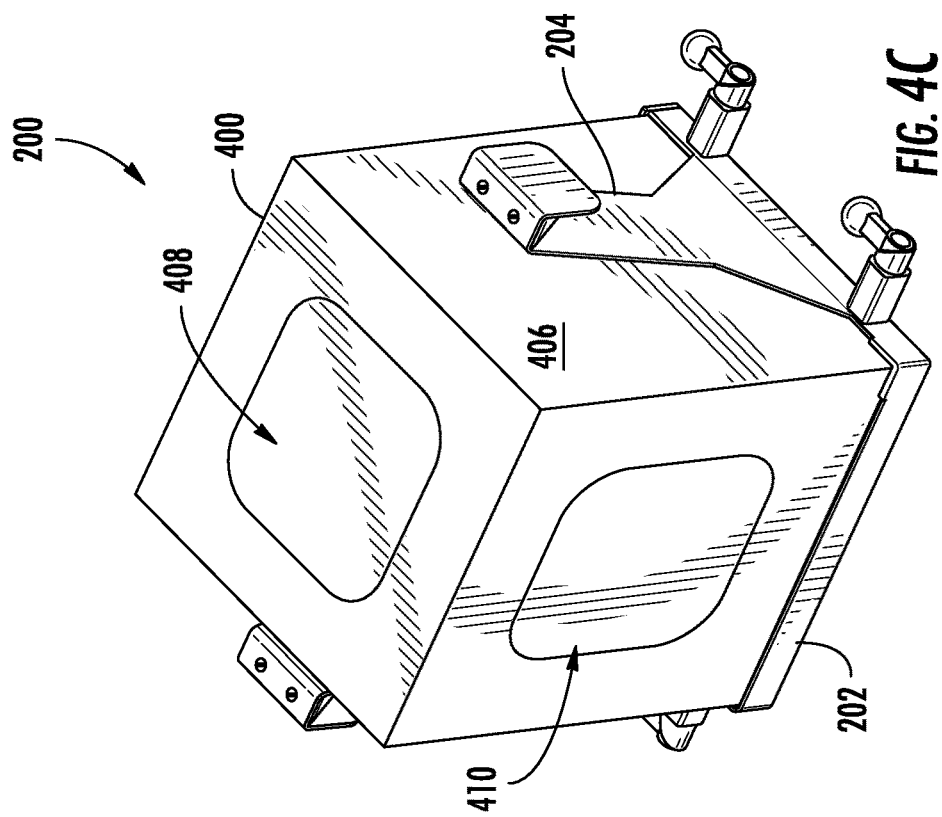
Figure 4B:
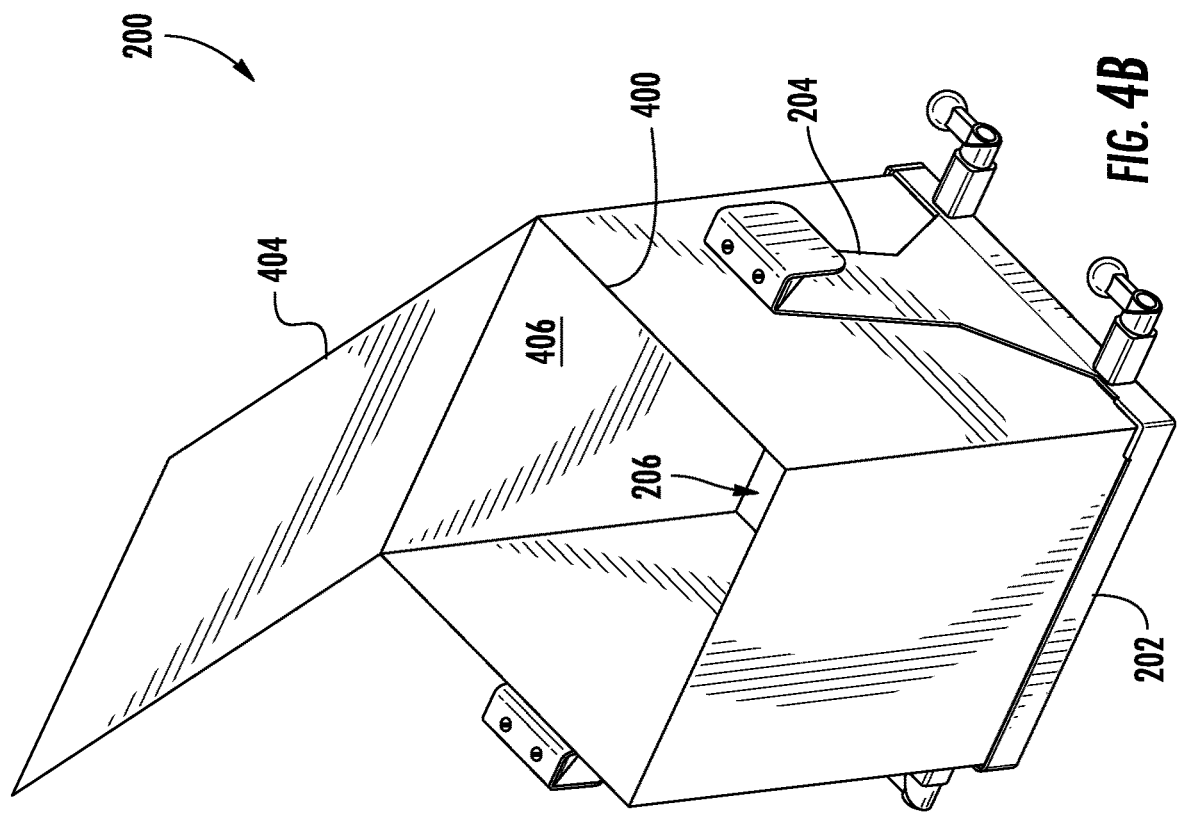

Now turning to FIGS. 4A-4C, in some embodiments, a carrying assembly 200 may include a containment module 400. The containment module may be configured to contain one or more additively manufactured components, such as during transport and/or storage, such as to prevent spillage of unsolidified powder material, protect the components from oxidizing environments such as ambient air and/or moisture that may cause damage to the components, and/or to keep the components securely accounted for before, during, and/or after various processing operations. The containment module 400 may be permanently fixed or removably secured to any suitable location of the carrying assembly 200, such as the perimeter frame 202. In some embodiments, the carrying arms 204 may be fixed to the containment module 400 in addition or as an alternative to being fixed to the perimeter frame 202. A carrying assembly 200 that includes a containment module 400 may be configured to transport one or more additively manufactured components that are surrounded by unsolidified powder material.

As shown in FIG. 4A, in some embodiments the containment module 400 may be removably secured to the carrying assembly 200 (e.g., to the perimeter frame 202) by one or more latches 402. Additionally, or in the alternative, the containment module 400 may be removably secured to the perimeter frame 202 by operation of one or more actuators 212 such that corresponding indexing pins 208 pass through a respective passage (not shown) in the containment module 400, such as prior to passing through the corresponding bores 210 in the carrying plate 206.

As shown in FIG. 4B, in some embodiments, a containment module 400 may include a lid 404 configured to access and remove components and/or unsolidified powder from the containment module 400. The lid 404 may be hingedly attached to a sidewall 406 of the containment module 400.

Additionally, or in the alternative, as shown in FIG. 4C, a containment module may include one or more powder removal ports 408 and/or one or more windows 410. The one or more powder removal ports 408 may be configured for manually and/or automatically unpacking components from unsolidified powder and removing the components and/or unsolidified powder from the containment module 400. In some embodiments, the one or more powder removal ports 408 may be coupled to a powder unpacking system configured to perform an unpacking process. An exemplary unpacking process may include manual and/or automated unpacking tools such as vacuums, blowers, brushes and so forth. In some embodiments, one or more finishing processes may be performed upon one or more components housed within the containment module 400. Exemplary finishing processes may include thermal, mechanical, and/or chemical treatments, such as to give the components desired strength, surface finish, and/or other properties or features.

Figure 5A:
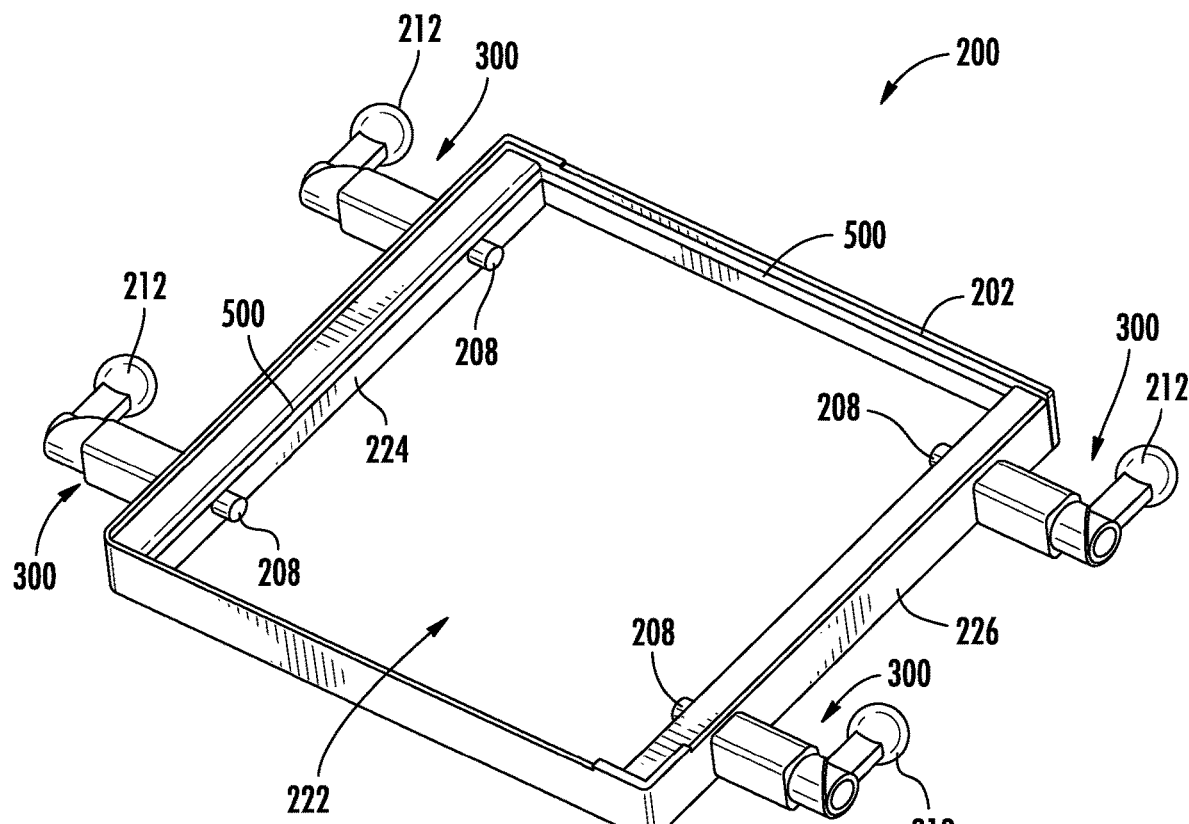
FIGS. 5A-5C schematically depict an exemplary embodiment of a carrying assembly with a powder seal.
Figure 5B:
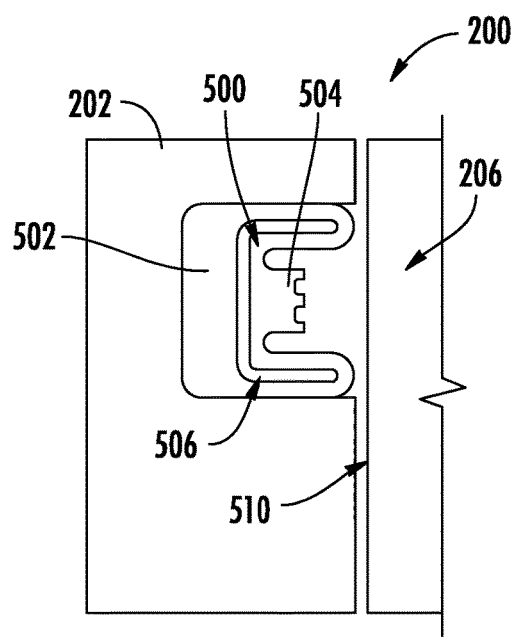
Figure 5C:
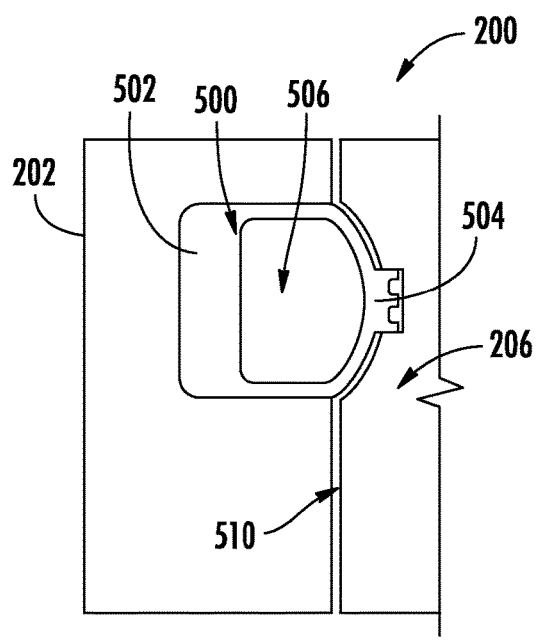

Now turning to FIGS. 5A-5C, in some embodiments, a carrying assembly 200 may include one or more powder seals 500 configured to reduce or prevent loss of unsolidified powder material. For example, as shown, the perimeter frame 202 may include one or more powder seals 500 configured to prevent unsolidified powder material from falling between the carrying plate 206 and the perimeter frame 202. In some embodiments, as shown, for example, in FIGS. 5B and 5C, the one or more powder seals 500 may be inflatable. An inflatable powder seal 500 may include a fixed portion 502, an inflating portion 504. The inflating portion 504 may be moved to and/or situated in a contracted state (FIG. 5B) when a fluid (e.g., gas or liquid) has been at least partially evacuated from an inflatable volume 506. The inflatable portion 504 may be moved to and/or situated in an inflated state (FIG. 5C) when the fluid has been at least partially introduced into the inflatable volume 506. When in a contracted state, the inflatable portion 504 of the powder seal 500 may be positioned so as to allow the perimeter frame 202 to receive a carrying plate 206 within the receiving area 222 without interference from the powder seal 500. With the powder seal 500 in an inflated state and a carrying place situated in the receiving area 222, the inflatable portion 504 of the powder seal 500 may press snugly against a perimeter wall 510 of the carrying plate 206, thereby reducing or preventing unsolidified powder material from falling between the carrying plate 206 and the perimeter frame 202. In some embodiments, the perimeter wall 510 of the carrying plate 206 may include a groove 512 configured to receive at least a portion of the powder seal 500, such as the inflatable portion 504 of the powder seal 500. The groove 512 may provide for increased contact between the powder seal 500 and the perimeter wall 510 of the carrying plate 206.

Now turning to FIG. 6, exemplary methods of transporting carrying plates will be described, including methods of transporting carrying plates supporting additively manufactured components. Exemplary methods may include transporting a carrying plate supporting additively manufactured components that have been additively manufactured on the carrying plate, such as removing the carrying plate from an additive manufacturing machine and transporting the components from an additive manufacturing machine to another workstation in an additive manufacturing system or plant. Additionally, or in the alternative, exemplary methods may include transporting a carrying plate to an additive manufacturing machine, and positioning the carrying plate in the additive manufacturing machine, such as to utilize the carrying plate when additively manufacturing components.

An exemplary method 600 may include, at block 602, detachably securing a carrying plate 206 to a perimeter frame 202 of a carrying assembly 200 with one or more indexing pins 208 extending or extensible inwardly from the perimeter frame 202, and with the perimeter frame 202 surrounding a perimeter of the carrying plate 206. An exemplary method may additionally, or alternatively include, at block 604, transporting the carrying assembly 200 with a lifting assembly 102. The lifting assembly 102 may include a carriage 104 that has one or more lifting arms 106 configured to lift the carrying assembly 200 at least in part by one or more carrying arms 204 of the carrying assembly 200.

In some embodiments, an exemplary method 600 may include, at block 606, raising the carrying plate 206 towards the carrying assembly 200 and/or lowering the carrying assembly 200 towards the carrying plate 206, such that the carrying plate 206 slides into a receiving area 222 defined by an inner perimeter of the perimeter frame 202. Upon having slid the carrying plate 206 into the receiving area 222, the perimeter frame 202 may surround the outer perimeter of the carrying plate.

One embodiment of the exemplary method 600 is illustratively shown, for example, in FIGS. 7A-7C. Referring to FIGS. 7A and 7B, an additive manufacturing machine 700 may include a build module 702 with a vertically adjustable build platform 704. When additively manufacturing one or more components 706, the build platform 704 may support a carrying plate 206 configured to support the additively manufactured components. At the start of a build, the carrying plate 206 may be situated at or about an elevation of a build plane 708 upon which layers of powder material are sequentially applied and selectively irradiated by an energy beam. As the sequential layers are applied and irradiated, the build platform 704 and the carrying plate 206 supported by the build platform are lowered sequentially into a build chamber 710, for example by a build piston 712. The build chamber 710 holds the unsolidified powder material surrounding the additively manufactured components 706 as the build progresses through the sequential layers.

Referring to FIG. 7B, after the sequential layers of powder material used to form the components 706 have been applied and irradiated, the carrying plate 206 is raised towards the build plane 708. The carrying plate 206, which may support one or more components 706, may be raised from within the build chamber 710 by the build platform 704, such as by operation of the build piston 712. The components 706 may be unpacked before, during, and/or after raising the carrying plate 206.

Figure 6:
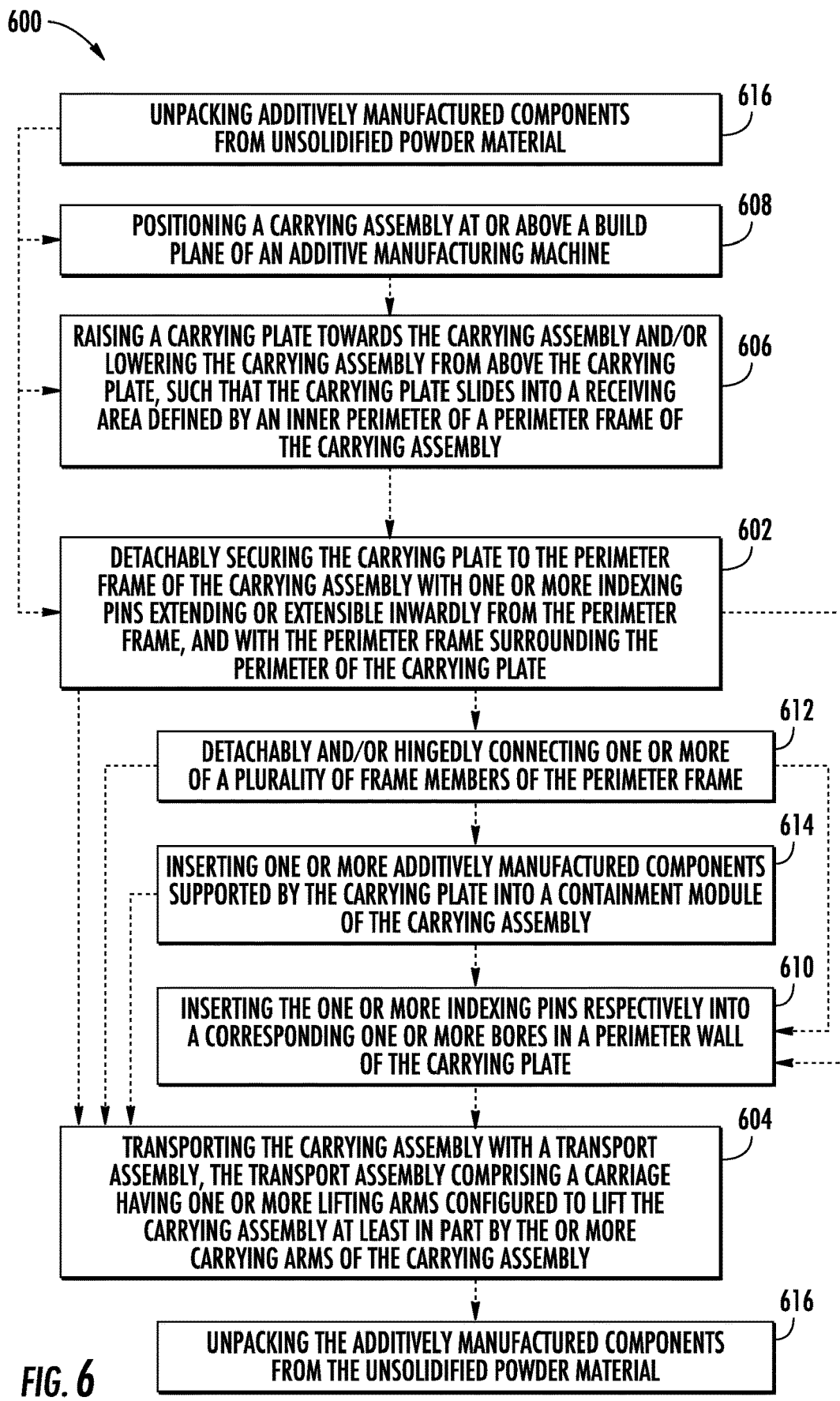
FIG. 6 shows a flowchart depicting an exemplary method of transporting a carrying plate, such as a carrying plate supporting additively manufactured components.

The exemplary method 600 may include, at block 608 of FIG. 6, positioning the carrying assembly 200 at or above the build plane 708. As shown in FIG. 7B, the build plane 708 and/or the carrying assembly 200 may include indexing elements 714 configured to align the carrying assembly with the carrying plate 206. For example, the indexing elements 714 may be configured to position the perimeter frame 202 such that the inner perimeter of the perimeter frame 202 aligns with the outer perimeter of the carrying plate 206, as shown, for example, in FIG. 7C.

In some embodiments, detachably securing the carrying plate 206 to the perimeter frame 202 may include, at block 610 of FIG. 6, inserting the one or more indexing pins respectively into a corresponding one or more bores 210 in a perimeter wall of the carrying plate 206. The one or more indexing pins may be inserted into the corresponding one or more bores 210 by manually or automatically actuating a corresponding one or more actuators 212 respectively configured to cause the corresponding one or more indexing pins to extend inwardly from the perimeter frame 202.

Referring to FIGS. 8A-8C, and 9A-9C in some embodiments, the perimeter frame 202 may include a plurality of detachable and/or hingedly connected frame members, and an exemplary method 600 may include detachably securing the carrying plate to the perimeter frame at least in part by detachably and/or hingedly connecting one or more of a plurality of frame members of the perimeter frame 202. In some embodiments, an exemplary method 600 may include, at block 612 of FIG. 6, detachably and/or hingedly connecting one or more of a plurality of frame members of the perimeter frame 202 to one another.

Figure 9C:
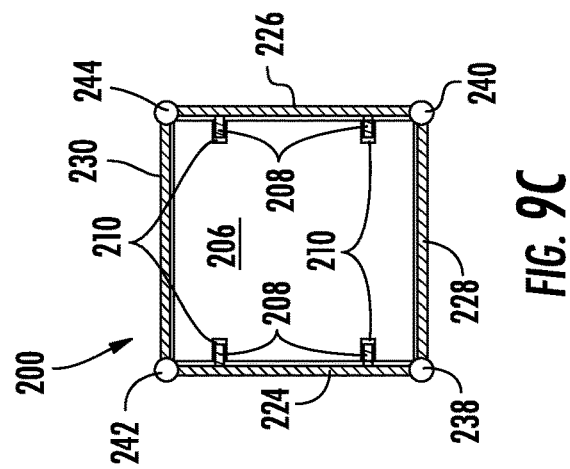
FIGS. 9A-9C schematically depict a carrying plate being detachably secured to yet another exemplary carrying assembly.

In some embodiments, as shown for example in FIGS. 8A-8C, the carrying plate 206 may be detachably secured to the perimeter frame 202 by moving the carrying plate 206 laterally towards the carrying assembly 200 and/or moving the carrying assembly 200 laterally towards the carrying plate 206 (FIG. 8A), such that the carrying plate 206 slides laterally into a receiving area 222 defined by an inner perimeter of the perimeter frame 202, with the perimeter frame 202 surrounding the outer perimeter of the carrying plate 206 (FIG. 8B). For example, a rear frame member 230 may be hingedly positioned in a state of extension to provide access for the carrying plate to slide laterally into the receiving area 222. The one or more indexing pins 208 may be retracted to provide access to the receiving area 222 (FIG. 8A). After the carrying plate 206 has been slide laterally into the receiving area 222, the one or more indexing pins 208 may be inserted into one or more corresponding bores 210 in the perimeter wall of the carrying plate 206. The rear frame member 230 may be hingedly positioned in a state of flexion, and a detent or quick-release pin, or the like may be used to detachably and/or hingedly connect the plurality of frame members of the perimeter frame 202 (FIG. 9C). For example, a fourth detent 244 may be used to detachably and/or hingedly connect the rear frame member 230 to a right frame member 226 of the perimeter frame 202.

Figure 9B:
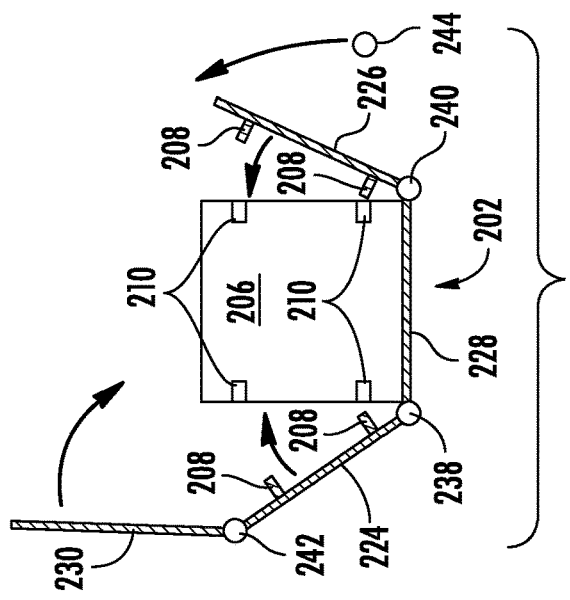
Figure 9A:
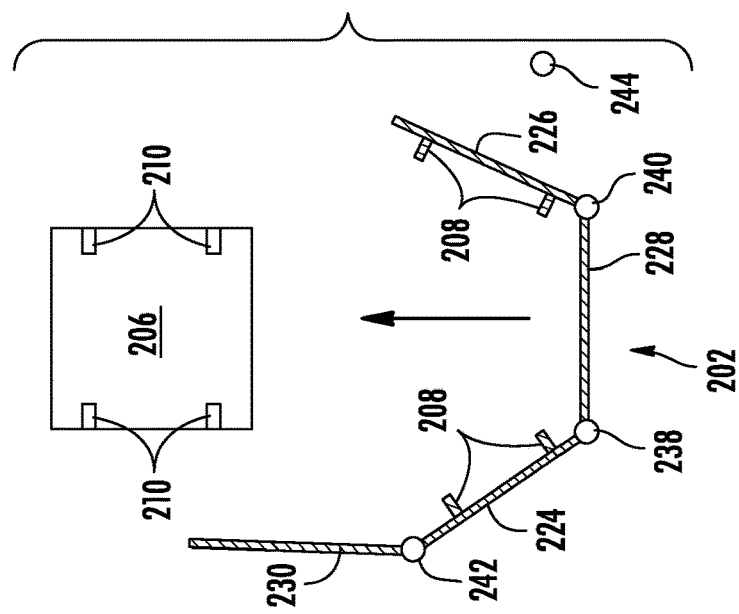

In some embodiments, as shown for example in FIGS. 9A-9C, the carrying plate 206 may be detachably secured to the perimeter frame 202 by wrapping one or more hinged portions of the perimeter frame 202 around the carrying plate 206 (FIGS. 9A and 9B). For example, a left frame member 224, a right frame member 226, a front frame member 228, and/or a rear frame member 230, may be hingedly positioned in a state of extension to allow the plurality of frame members to be wrapped around the carrying plate 206 (FIG. 9A). The one or more indexing pins 208 may be fixed in a stationary position relative to the perimeter frame 202. The one or more indexing pins 208 may be respectively inserted into the corresponding one or more bores 210 by wrapping the one or more hinged portions of the perimeter frame 202 around the carrying plate 206 (FIG. 9B). After the one or more hinged portions of the perimeter frame 202 are wrapped around the carrying plate 206, a detent or quick-release pin, or the like may be used to detachably and/or hingedly connect the plurality of frame members (FIG. 9C). For example, a fourth detent 244 may be used to detachably and/or hingedly connect the rear frame member 230 to a right frame member 226 of the perimeter frame 202.

Figure 10A:
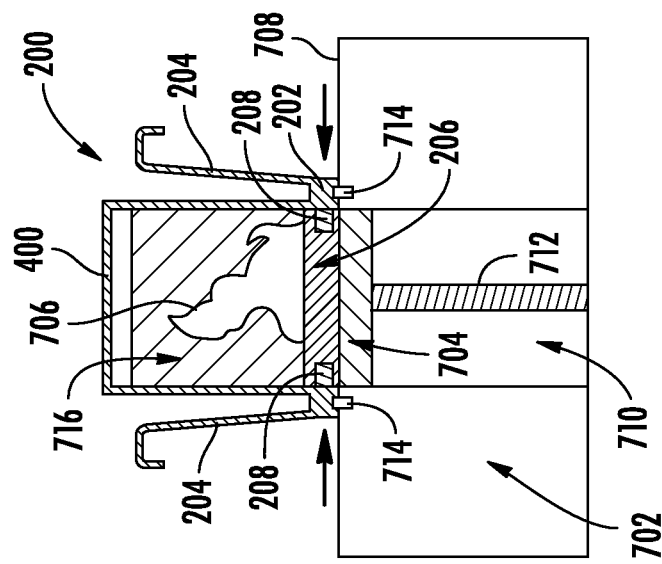
FIGS. 10A-10E schematically depict a carrying plate being detachably secured to an exemplary carrying assembly that includes a containment module, and one or more additively manufactured components supported by the carrying assembly being unpacked from unsolidified powder housed in the containment module after being transported to a workstation for unpacking.
Figure 10B:
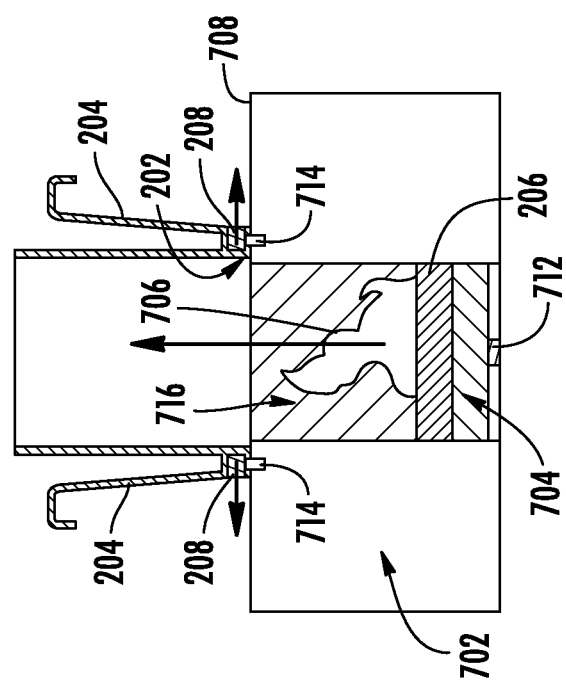
Figure 10E:
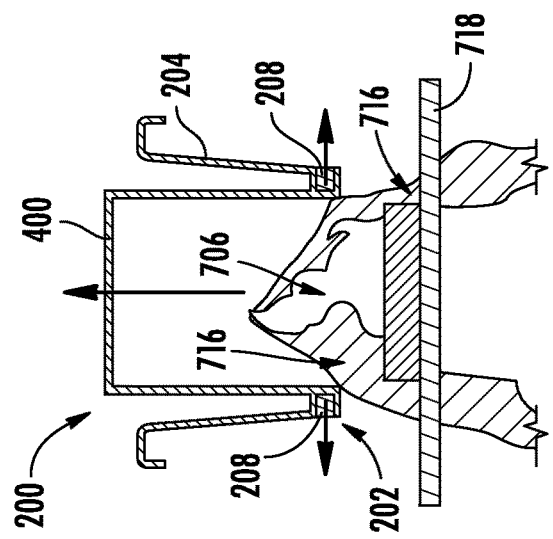
Figure 10D:
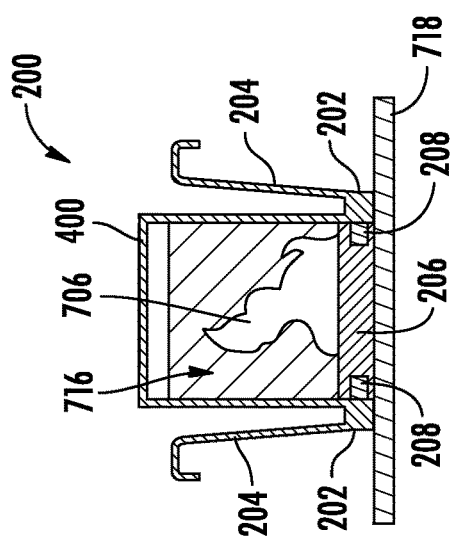
Figure 10C:
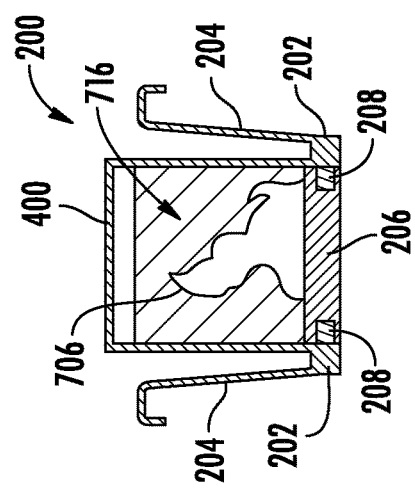

Referring to FIGS. 10A-10E, in some embodiments, the carrying assembly 200 may include a containment module 400. An exemplary method 600 may include, at block 614 of FIG. 6, inserting one or more additively manufactured components 706 supported by the carrying plate into the containment module 400 of the carrying assembly 200 (FIGS. 10A and 10B). The additively manufactured components 706 may be at least partially surrounded by unsolidified powder material 716. Alternatively, an exemplary method may include, at block 616 of FIG. 6, unpacking the additively manufactured components 706 from the unsolidified powder material 716, such as prior to or after having detachably secured the carrying plate 206 to the perimeter frame 202 at block 602. In some embodiments, the containment module 400 may house additively manufactured components 706 at least partially surrounded by unsolidified powder material 716 when transporting the carrying assembly 200 (FIG. 10C). For example, the carrying module may be transported to a workstation 718, such as an unpacking station, located elsewhere in the additive manufacturing system (FIG. 10D). An exemplary method may include, at block 618 of FIG. 6, unpacking the additively manufactured components 706 from the unsolidified powder material 716, such as after having transported the carrying assembly at block 602. For example, as shown in FIG. 10E, the additively manufactured components 706 may be unpacked at an unpacking station located elsewhere in the additive manufacturing system.

Further aspects of the invention are provided by the subject matter of the following clauses:

1. A carrying assembly for transporting a carrying plate for use in an additive manufacturing process, the carrying assembly comprising: a perimeter frame configured to surround a perimeter of a carrying plate: one or more carrying arms attached to the perimeter frame; one or more indexing pins extending or extensible inwardly from the perimeter frame, the one or more indexing pins configured to detachably secure the carrying plate to the perimeter frame.

2. The carrying assembly of any preceding clause, wherein: the perimeter frame comprises a plurality of frame members that are integrally fixed or securely fastened to one another: or the perimeter frame comprises a plurality of hingedly and/or detachably connected frame members.

3. The carrying assembly of any preceding clause, wherein: the perimeter frame comprises a plurality of frame members that are integrally fixed or securely fastened to one another, and wherein the perimeter frame is configured to receive the carrying plate in a receiving area defined by an inner perimeter of the perimeter frame by raising the carrying plate towards the carrying assembly and/or lowering the carrying assembly towards the carrying plate, such that the carrying plate slides into the receiving area: and/or the perimeter frame comprises a plurality of hingedly connected frame members, and wherein the perimeter frame is configured to receive the carrying plate in the receiving area by sliding the perimeter frame laterally relative to the carrying plate with at least one of the plurality of hingedly connected members in an extension position.

4. The carrying assembly of any preceding clause, wherein the one or more indexing pins are insertable into a corresponding bore in a perimeter wall of the carrying plate.

5. The carrying assembly of any preceding clause, wherein: the one or more indexing pins are respectively fixed in a stationary position relative to the perimeter frame: or the one or more indexing pins are configured to engage with a corresponding bore in a perimeter wall of the carrying plate by actuating an actuator.

6. The carrying assembly of any preceding clause, wherein the one or more carrying arms respectively comprise a lifting point at a distal portion of the respective carrying arm, the lifting point comprising a lifting block configured to interface with a carrying recess on a corresponding lifting arm of a lifting assembly configured to transport the carrying assembly.

7. The carrying assembly of any preceding clause, wherein the carrying assembly comprises a containment module.

8. The carrying assembly of any preceding clause, wherein the containment module comprises a lid, a powder removal port, and/or a window.

9. The carrying assembly of any preceding clause, wherein the perimeter frame comprises one or more powder seals configured to prevent unsolidified powder material from falling between the carrying plate and the perimeter frame.

10. A system for transporting a carrying plate for use in an additive manufacturing process, the system comprising: a lifting assembly comprising a carriage: and a carrying assembly comprising: a perimeter frame configured to surround a perimeter of a carrying plate, one or more carrying arms attached to the perimeter frame, and one or more indexing pins extending or extensible inwardly from the perimeter frame, the one or more indexing pins configured to detachably secure the carrying plate to the perimeter frame.

11. The system of any preceding clause, wherein the carriage comprises: one or more lifting arms configured to lift the carrying assembly at least in part by the one or more carrying arms of the carrying assembly: and a mast comprising one or more transport mechanisms configured to transport the carriage.

12. The system of any preceding clause, comprising the carrying assembly of any preceding clause.

13. A method of transporting a carrying plate for use in an additive manufacturing process, the method comprising: detachably securing a carrying plate to a perimeter frame of a carrying assembly with one or more indexing pins extending or extensible inwardly from the perimeter frame, and with the perimeter frame surrounding a perimeter of the carrying plate; and transporting the carrying assembly with a lifting assembly, the lifting assembly comprising a carriage having one or more lifting arms configured to lift the carrying assembly at least in part by one or more carrying arms of the carrying assembly.

14. The method of any preceding clause, comprising: receiving the carrying plate in a receiving area defined by an inner perimeter of the perimeter frame by raising the carrying plate towards the carrying assembly and/or lowering the carrying assembly towards the carrying plate, such that the carrying plate slides into the receiving area.

15. The method of any preceding clause, comprising: detachably securing the carrying plate to the perimeter frame at least in part by detachably and/or hingedly connecting one or more of a plurality of frame members to one another.

16. The method of any preceding clause, comprising: receiving the carrying plate in the receiving area at least in part by sliding the perimeter frame laterally relative to the carrying plate; and/or receiving the carrying plate in the receiving area at least in part by wrapping one or more hinged portions of the perimeter frame around the carrying plate.

17. The method of any preceding clause, comprising: manually or automatically actuating one or more actuators respectively configured to cause the one or more indexing pins to extend inwardly from the perimeter frame and into a corresponding one or more bores in a perimeter wall of the carrying plate.

18. The method of any preceding clause, comprising: receiving the carrying plate in the receiving area at least in part by wrapping one or more hinged portions of the perimeter frame around the carrying plate: wherein the perimeter frame comprises one or more indexing pins fixed in a stationary position relative to the perimeter frame; and wherein the one or more indexing pins are respectively inserted into a corresponding one or more bores in a perimeter wall of the carrying plate when wrapping the one or more hinged portions of the perimeter frame around the carrying plate.

19. The method of any preceding clause, comprising: inserting one or more additively manufactured components supported by the carrying plate into a containment module of the carrying assembly by raising the carrying plate towards the carrying assembly.

20. The method of any preceding clause, wherein the one or more additively manufactured components are at least partially surrounded by unsolidified powder material.

21. The method of any preceding clause, comprising: unpacking the one or more additively manufactured components from the unsolidified powder material after transporting the carrying assembly.

22. The method of any preceding clause, wherein the method is performed using the carrying assembly of any preceding clause, and/or wherein the method is performed in connection with the system of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A carrying assembly for transporting a carrying plate for use in an additive manufacturing process, the carrying assembly comprising:
   a perimeter frame configured to surround a perimeter of a carrying plate;
   one or more carrying arms attached to the perimeter frame; and
   one or more indexing pins extending or extensible inwardly from the perimeter frame, the one or more indexing pins configured to detachably secure the carrying plate to the perimeter frame, wherein the one or more carrying arms respectively comprise a lifting point at a distal portion of the respective carrying arm, the lifting point comprising a lifting block configured to interface with a carrying recess on a corresponding lifting arm of a lifting assembly configured to transport the carrying assembly.

2. The carrying assembly of claim 1, wherein:
the perimeter frame comprises a plurality of frame members that are integrally fixed or securely fastened to one another; or
the perimeter frame comprises a plurality of hingedly and/or detachably connected frame members.

3. The carrying assembly of claim 1, wherein:
the perimeter frame comprises a plurality of frame members that are integrally fixed or securely fastened to one another, and wherein the perimeter frame is configured to receive the carrying plate in a receiving area defined by an inner perimeter of the perimeter frame by raising the carrying plate towards the carrying assembly and/or lowering the carrying assembly towards the carrying plate, such that the carrying plate slides into the receiving area; and/or
the perimeter frame comprises a plurality of hingedly connected frame members, and wherein the perimeter frame is configured to receive the carrying plate in the receiving area by sliding the perimeter frame laterally relative to the carrying plate with at least one of the plurality of hingedly connected frame members in an extension position.

4. The carrying assembly of claim 1, wherein the one or more indexing pins are insertable into a corresponding bore in a perimeter wall of the carrying plate.

5. The carrying assembly of claim 1, wherein:
the one or more indexing pins are respectively fixed in a stationary position relative to the perimeter frame; or
the one or more indexing pins are configured to engage with a corresponding bore in a perimeter wall of the carrying plate by actuating an actuator.

6. The carrying assembly of claim 1, wherein the carrying assembly comprises a containment module.

7. The carrying assembly of claim 6, wherein the containment module comprises a lid, a powder removal port, and/or a window.

8. The carrying assembly of claim 1, wherein the perimeter frame comprises one or more powder seals configured to prevent unsolidified powder material from falling between the carrying plate and the perimeter frame.

9. A system for transporting a carrying plate for use in an additive manufacturing process, the system comprising:
a lifting assembly comprising a carriage; and
a carrying assembly comprising:
a perimeter frame configured to surround a perimeter of a carrying plate,
one or more carrying arms attached to the perimeter frame, and
one or more indexing pins extending or extensible inwardly from the perimeter frame, the one or more indexing pins configured to detachably secure the carrying plate to the perimeter frame, wherein the one or more carrying arms respectively comprise a lifting point at a distal portion of the respective carrying arm, the lifting point comprising a lifting block configured to interface with a carrying recess on a corresponding lifting arm of a lifting assembly configured to transport the carrying assembly.

10. The system of claim 9, wherein the carriage comprises:
one or more lifting arms configured to lift the carrying assembly at least in part by the one or more carrying arms of the carrying assembly; and
a mast comprising one or more transport mechanisms configured to transport the carriage.

11. A method of transporting a carrying plate for use in an additive manufacturing process, the method comprising:
detachably securing a carrying plate to a perimeter frame of a carrying assembly with one or more indexing pins extending or extensible inwardly from the perimeter frame, and with the perimeter frame surrounding a perimeter of the carrying plate; and
transporting the carrying assembly with a lifting assembly, the lifting assembly comprising a carriage having one or more lifting arms configured to lift the carrying assembly at least in part by one or more carrying arms of the carrying assembly, wherein the one or more carrying arms respectively comprise a lifting point at a distal portion of the respective carrying arm, the lifting point comprising a lifting block configured to interface with a carrying recess on a corresponding lifting arm of a lifting assembly configured to transport the carrying assembly.

12. The method of claim 11, comprising:
receiving the carrying plate in a receiving area defined by an inner perimeter of the perimeter frame by raising the carrying plate towards the carrying assembly and/or lowering the carrying assembly towards the carrying plate, such that the carrying plate slides into the receiving area.

13. The method of claim 12, comprising:
receiving the carrying plate in the receiving area at least in part by sliding the perimeter frame laterally relative to the carrying plate; and/or
receiving the carrying plate in the receiving area at least in part by wrapping one or more hinged portions of the perimeter frame around the carrying plate.

14. The method of claim 12, comprising:
receiving the carrying plate in the receiving area at least in part by wrapping one or more hinged portions of the perimeter frame around the carrying plate;
wherein the perimeter frame comprises one or more indexing pins fixed in a stationary position relative to the perimeter frame; and
wherein the one or more indexing pins are respectively inserted into a corresponding one or more bores in a perimeter wall of the carrying plate when wrapping the one or more hinged portions of the perimeter frame around the carrying plate.

15. The method of claim 11, comprising:
detachably securing the carrying plate to the perimeter frame at least in part by detachably and/or hingedly connecting one or more of a plurality of frame members to one another.

16. The method of claim 11, comprising:
manually or automatically actuating one or more actuators respectively configured to cause the one or more indexing pins to extend inwardly from the perimeter frame and into a corresponding one or more bores in a perimeter wall of the carrying plate.

17. The method of claim 11, comprising:
inserting one or more additively manufactured components supported by the carrying plate into a containment module of the carrying assembly by raising the carrying plate towards the carrying assembly.

18. The method of claim 17, wherein the one or more additively manufactured components are at least partially surrounded by unsolidified powder material.

19. The method of claim 18, comprising:
unpacking the one or more additively manufactured components from the unsolidified powder material after transporting the carrying assembly.

* * * * *